United States Patent
Liao et al.

(10) Patent No.: US 6,611,533 B1
(45) Date of Patent: *Aug. 26, 2003

(54) PUBLIC TELEPHONE NETWORK, INTELLIGENT NETWORK, AND INTERNET PROTOCOL NETWORK SERVICES INTERWORKING

(75) Inventors: Monling Liao, Raleigh, NC (US); Emad Qaddoura, Plano, TX (US); Russ Coffin, Plano, TX (US); Donald Wurch, Rockwall, TX (US); Liem Le, Richardson, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/334,964

(22) Filed: Jun. 17, 1999

Related U.S. Application Data

(60) Provisional application No. 60/115,678, filed on Jan. 13, 1999.

(51) Int. Cl.[7] .................................................. H04J 3/22
(52) U.S. Cl. ...................... 370/467; 709/230; 709/232; 709/236
(58) Field of Search ................................. 709/236, 230, 709/232; 370/466, 467

(56) References Cited

U.S. PATENT DOCUMENTS

| | | | | |
|---|---|---|---|---|
| 5,737,517 A | * | 4/1998 | Kite et al. ...................... | 714/38 |
| 5,838,782 A | * | 11/1998 | Lindquist ..................... | 379/230 |
| 5,850,391 A | * | 12/1998 | Essigmann .................. | 370/331 |

(List continued on next page.)

FOREIGN PATENT DOCUMENTS

| | | |
|---|---|---|
| EP | 0841831 A | 5/1998 |
| EP | 0915626 A | 5/1999 |
| GB | 2321159 A * | 7/1998 |
| WO | WO 99/29124 A | 6/1999 |

OTHER PUBLICATIONS

Michael McGrew; Transport SS7 Signalling Over IP; Internet Draft; Lucent Technologies; pp. 1–9; Nov. 1998.*
Monling Liao et al.; SS7–TCAP/IP Interworking; Nortel Networks; Internet Draft; IETF; pp. 1–14; Sep. 1999.*

(List continued on next page.)

Primary Examiner—Kenneth R. Coulter
(74) Attorney, Agent, or Firm—Withrow & Terranova, PLLC

(57) ABSTRACT

An apparatus, system, and method are provided for interworking the public telephone network and the IP network. The public telephone network transports a TCAP message in a first format, and the IP network transports an encapsulated TCAP message in a second format. A first interface communicates with the public telephone network, and exchanges TCAP messages therewith. A second interface communicates with the IP network, and exchanges encapsulated TCAP messages therewith. A processor operably connected to at least one of said first interface and said second interface translates TCAP messages in the first format to/from the encapsulated TCAP message in the second format. The processor is further adapted for forwarding TCAP messages in both formats to the respective network. The first format can be an SS7 protocol format, while the second format can be an IP protocol format as used in the IP network. Various message structures and encapsulation techniques are provided. Network addressing and routing functions are included. An apparatus for exchanging encapsulated TCAP messages with the IP network is provided. A system for interworking a public telephone network and an IP network is provided. The system comprises a first network node, a second network node, and at least one interworking apparatus having a processor adapted for exchanging TCAP messages with the public telephone network and the IP network, as described. Related methods for interworking between the IP network and the public telephone network are provided.

87 Claims, 14 Drawing Sheets

SS7 TCAP Message Into The IP Network

U.S. PATENT DOCUMENTS

| | | | | |
|---|---|---|---|---|
| 6,026,086 | A | * | 2/2000 | Lancelot et al. ............ 370/353 |
| 6,061,364 | A | * | 5/2000 | Hager et al. ................ 370/467 |
| 6,154,467 | A | * | 11/2000 | Hager et al. ................ 370/467 |
| 6,178,181 | B1 | * | 1/2001 | Glitho ........................ 370/467 |
| 6,480,597 | B1 | * | 11/2002 | Kult et al. .................. 370/242 |
| 6,529,524 | B1 | * | 3/2003 | Liao et al. .................. 370/467 |

OTHER PUBLICATIONS

Monling Liao et al.; Simple SS7–TCAP/IP Protocol (STIPP); Nortel Networks; Internet Draft; IETF; pp. 1–17; Mar. 1999.*

Fernando Cuervo et al.; SS7–Internet Interworking; Internet Draft; pp. 1–11; Jul. 1998.*

J. Schmitt et al.; Interaction Approaches for Internet and ATM Quality of Service Architectures; IEEE International Conference on ATM; Jun. 22–24, 1998.*

John Yoakum; IPS7 Open Architecture; Nortel Networks; pp. 1–9; May, 1999.*

L. Ong et al.; Framework Architecture for Signaling Transport; RFC 2719; pp. 1–21; Oct. 1999.*

Hamdi, M. et al., "Voice Service Interworking for PSTN and IP Networks," IEEE Communications Magazine, pp. 104–111, XP–000830888, May 1999.

International Search Report, mailed Nov. 28, 2000.

* cited by examiner

PUBLIC TELEPHONE NETWORK, INTELLIGENT NETWORK, AND INTERNET PROTOCOL NETWORK SERVICES INTERWORKING

CROSS-REFERENCE TO RELATED APPLICATIONS

This application is related to and claims priority from U.S. Provisional Application No. 60/115,678, filed Jan. 13, 1999, entitled "Methods and Systems for SS7-TCAP Interworking", which is herein incorporated by reference in its entirety.

FIELD OF THE INVENTION

The present invention relates to telecommunications and networking, and more particularly to an apparatus, system, and related methods for interworking services between public telephone networks, Intelligent Networks, and Internet Protocol (IP) networks.

BACKGROUND OF THE INVENTION

Telecommunications originated over a century ago using traditional landline based telephony technology. Over time, standards, protocols, and topologies were developed and optimized to provide telephony services. More recently, wireless telephony was developed as an alternative means of telecommunications. Wireless telephony evolved with its own separate and distinct standards, protocols, and topologies optimized for the mobile telephony environment. The SS7 (Signaling System 7) network was developed to provide digital out-of-band signaling channels for both the landline and wireless telephone networks. The modern public telephone network (PTN) leverages SS7 capabilities to establish telephone call connections and provide advanced services, such as 800 or toll free, calling card, Intelligent Network services, Call Back, Calling Name Delivery, Local Number Portability and wireless roaming services. Further, new architectures and interfaces have been developed recently that permit further integration and cooperation between landline and wireless telephony networks. It has been proven advantageous to share resources and provide PTN services more generically, without being concerned whether the telephone terminals involved in the communication are landline or wireless.

Recently, the IP network (including the public Internet) developed in parallel with the converging landline and wireless telephony infrastructures. While the function of the PTN network was primarily to provide end to end connections between telephone service subscribers, IP networks were developed to interconnect and leverage the information and processing capabilities of millions of networked computers. Given the substantially more complex purpose of the IP network, it evolved as a separate network infrastructure with distinct protocols optimized for the functions to be provided.

Over time, the functions provided by the PTN network have become increasingly more sophisticated. Therefore, it is not surprising that cooperation between the IP network and PTN network is desired, and in some instances, required. For example, it would be advantageous to provide services to the PTN network from the vast resources resident on the IP network. In this regard, one early application used the IP network to setup a connection and establish a voice telephone call. The IP telephone call can be originated from any telephone terminal, such as a conventional telephone terminal or an appropriately equipped computer connected to the IP network, and placed to another telephone terminal, such as any other conventional telephone terminal or another appropriately equipped computer connected to the IP network. While this capability is useful, the IP telephone calls are only capable of establishing an end to end connection across the IP network. As such, no other services or applications can cross the IP network and PTN network border, although the need for doing so persists.

The IETF (Internet Engineering Task Force) is an open international community of network designers, operators, vendors, and researchers concerned with the evolution of the Internet architecture and the smooth operation of the Internet. The actual technical work of the IETF is done in its working groups, which are organized by topic into several areas (e.g., routing, transport, security, etc.). Much of the work is handled via email mailing lists and electronic document submissions. Proposals are discussed, evolved, and implemented if advantageous. Proposals have been submitted attempting to converge the capabilities of the IP networks and telecommunication networks. In services interworking for IP telephone calls, one submitted proposal suggests encapsulating the SS7 protocol stack from the link layer to the above layers, including the MTP level 2 and level 3 layers, the SCCP layer, and the TCAP layer. Another proposal suggests encapsulating the SCCP layer and the above layers in the SS7 protocol stack. However, neither proposal properly addresses differences in the addressing and routing functions as implemented in the IP networks and the PTN networks. In addition, neither proposal defines a convergent protocol between these diverse networks. At best, these proposals might ultimately provide transport on the IP network between two PTN networks.

However, in order to effectively converge and leverage these distinct networks, true interworking is required. Interworking is defined as transporting a message between a first network entity executing a software application program in a first network domain and a second network entity executing a software application program in a second network domain. In other words, interworking refers to exchanging messages between software application programs executing in different network domains. The above proposals fail to provide exchanges of PTN messages, such as TCAP (Transaction Capabilities Application Part) messages, between entities in different networking domains, such as the IP network and the PTN network. Accordingly, a TCAP application executing in IP network and a TCAP application executing in a telecommunication network cannot exchange TCAP messages, cannot exchange telephony services, and cannot interwork effectively. As such, a need exists for a fully functional interworking solution between the IP network and the PTN network to preserve the transparency of TCAP messaging in the PTN networks while the TCAP messages are routed to or from IP networks. Were this solution achieved, telephony based services could be provided from the public telephone network, the IP network, or both, as desired. A number of other advantages would also likely emerge from fully functional interworking between the IP network and the public PTN telephone network, as was observed from the convergence of the landline and wireless network infrastructures.

SUMMARY OF THE INVENTION

The present invention provides an apparatus, system, and method for interworking services between the IP network and the public telephone network, including the Intelligent Network and wireless networks. As such, the present invention addresses at least some of the above needs while providing some advantages. According to the present invention, conventional TCAP messages from the public telephone network can be exchanged with encapsulated TCAP messages in the IP network. Software application programs executing in network nodes disposed in the IP network and in the public telephone network can thereby cooperatively process information and exchange services therebetween. Existing services can be provided to telephony services subscribers, while new services could be developed by leveraging the processing capability of network nodes in the IP network, according to the present invention.

In one embodiment, the present invention provides an apparatus for selectively interworking a public telephone network and an IP network comprising a first interface, a second interface, and a processor. Since the public telephone network transmits and receives a TCAP message in a first format and the IP network transmits and receives a second type of message in a second format, interworking is required. The first interface is used for communicating with the public telephone network, and is adapted to exchange TCAP messages in the first format with the public telephone network. Analogously, the second interface is used for communicating with the IP network, and is adapted to exchange the second type of messages in the second format with the IP network. The processor is operably connected to at least one of said first interface and said second interface. Further, the processor is adapted for translating the TCAP message received in the first format from the public telephone network, encapsulating the TCAP message in the second format, and forwarding the encapsulated TCAP message to the IP network. In another embodiment, the processor is further adapted to translate an encapsulated TCAP message received from the IP network and forwarding a TCAP message in the first format to the public telephone network.

An embodiment of the present invention further comprises a storage memory operably connected to the processor for maintaining addressing and routing information related to the public telephone network and the IP network. This storage memory may contain a table correlating a plurality of IP network node addresses and a plurality of public telephone network node addresses, such that the processor can remap the address of an incoming message received from one network into a destination address in the other network. In one embodiment, each IP network node address may comprise an IP address and a port number, and each public telephone network node address may comprise a destination point code and a global title or a subsystem number. In a further embodiment, the processor is adapted to provide approximately SCCP addressing and routing to the IP network, and SCCP addressing and routing to the public telephone network.

In yet a further embodiment, the processor is adapted to serve as a signaling endpoint for the public telephone network and adapted to operate as a signaling transit point for the IP network. In addition, the processor may further be adapted to provide signaling transfer point functions and represent a network node in the public telephone network. The processor can be adapted to forward the encapsulated TCAP message to the IP network and represent a network node in the IP network. The processor can translate the TCAP message received from either the public telephone network or the IP network without altering the TCAP characteristics thereof. Other embodiments describe the translation of messages exchanged in the first format with the public telephone network to/from a second format used within the IP network. Encapsulation and decapsulation message formats are also provided.

In one embodiment, the present invention further provides an apparatus for exchanging encapsulated TCAP messages with the IP network comprising a first interface and a processor. The IP network is adapted to transmit and receive a second type of message in a second format. The first interface is used for communicating with the IP network, and is adapted to exchange encapsulated TCAP messages in the second format with the IP network. The processor is operably connected to the first interface, and is adapted to extract a TCAP message from an encapsulated TCAP message in the second format received from the IP network through the first interface. Further, the processor is adapted to encapsulate a TCAP message and forward the encapsulated TCAP message in the second format to the IP network through the first interface. Accordingly, encapsulated TCAP messages in the second format can be exchanged with the IP network. One embodiment provides the processor adapted to execute TCAP software applications, such that telephony services may be provided by exchanging encapsulated TCAP messages with the Internet. The processor may be adapted to execute a STIP software application such that the SCCP primitives can be provided to the TCAP software application.

In an additional embodiment, the apparatus further comprises a translation device having an IP network interface for communicating with the Internet and having a public telephone network interface for communicating with the public telephone network. The translation device is operably connected to the apparatus through the IP network interface, and is connected to the public telephone network. The translation device is adapted for receiving an encapsulated TCAP message from the apparatus through the IP network, and forwarding a representative TCAP message to the public telephone network. Further, the translation device is adapted for receiving a TCAP message from the public telephone network, and forwarding a representative encapsulated TCAP message to the apparatus through the IP network. Accordingly, TCAP messages can be exchanged between the apparatus and the public telephone network through the IP network.

One embodiment of the present invention provides a system for selectively interworking a public telephone network and an IP network, comprising a first network node, a second network node, and at least one interworking apparatus. The interworking apparatus is operably connected to at least one of the first network node and the second network node. Each interworking apparatus further comprises a first interface, a second interface, and a processor. The first interface is used for communicating with the public telephone network, and is adapted to exchange TCAP messages in a first format with the public telephone network. The second interface is used for communicating with the IP network, and is adapted to exchange Internet messages in a second format with the IP network. Further, the processor is operably connected to the first interface and the second interface, and is adapted to extract a TCAP message received in the first format from the public telephone network and to forward an encapsulated TCAP message in the second format to the IP network. In addition, the processor is adapted for translating an encapsulated TCAP message received in the second format from the IP network and forwarding a TCAP message in the first format to the public telephone network.

Various embodiments of the system according to the present invention are provided. In one embodiment of the system, the first network node comprises part of the telephone network and the second network node comprises of part of the IP network.

Further embodiments provide a processor at the first network node and the second network node, such that each processor can execute a TCAP software application program while TCAP messages and encapsulated TCAP messages are exchanged therebetween.

Other embodiments of the system provide interconnected first and second interworking apparatuses, the first network node connected to the first interworking apparatus, and the second network node connected to the second interworking apparatus. In one embodiment, the first network node and second network node are in a first telephone network and second telephone network respectively. The telephone networks are connected by the IP network through the pair of interworking apparatuses. Various telephony services and signaling transport functions may be exchanged between the first public telephone network and the second public telephone network in the system. In addition, two IP networks can be interconnected in a similar manner, except that the pair of interworking apparatuses is interconnected by the public telephone network. Other system configurations provide Internet telephone terminal to public telephone network connections, short message service messaging service, and various other telephony services provided by the system. Various telephony services and signaling transport functions between the first public telephone network and the second public telephone network may be provided by the system.

One embodiment of the present invention provides an apparatus for selectively interworking the public telephone network and the IP network which comprises means for communicating with the public telephone network, means for communicating with the IP network, and means for translating messages. The means for communicating with the public telephone network is adapted to exchange TCAP messages over the SS7 protocol format with the public telephone network, and to exchange TCAP messages over the IP protocol format with the IP network. The means for translating a message is adapted for translating a TCAP message received in the SS7 protocol format from the public telephone network and forwarding an encapsulated TCAP message in the IP protocol format to the IP network.

Another embodiment of the present invention provides a system for selectively interworking the public telephone network and the IP network, comprising a first network node, a second network node, and at least one interworking apparatus. The interworking apparatus is operably connected to at least one of the first network node and the second network node. Each interworking apparatus further comprises means for communicating with the public telephone network, means for communicating with the IP network, and means for translating. The means for communicating with the public telephone network is adapted to exchange TCAP messages over the SS7 protocol format with the public telephone network, and to exchange TCAP messages over the IP protocol format with the IP network. The means for translating is adapted to translate a TCAP message received in the SS7 protocol format from the public telephone network and forwarding an encapsulated TCAP message in the IP protocol format to the IP network. The means for translating is further adapted to translate an encapsulated TCAP message received in the IP protocol format from the IP network, and forwarding a TCAP message in the SS7 protocol format to the public telephone network.

One embodiment of the present invention further provides an apparatus for exchanging encapsulated TCAP messages with the IP network, comprising means for communicating with the IP network, and means for translating. The means for communicating with the IP network is adapted to exchange encapsulated TCAP messages over the IP protocol format with the IP network. The means for translating is adapted to extract a TCAP message from a encapsulated TCAP message received from the IP network, and to encapsulate the TCAP message and forward an encapsulated TCAP message to the IP network, such that the encapsulated TCAP messages can be exchanged with the IP network. The aforementioned apparatuses and systems may be adapted to exchange TCAP messages in an SS7 protocol format with the telephone network and exchange encapsulated TCAP messages in an IP protocol format with the IP network.

A further embodiment of the present invention provides a method for selectively interworking the public telephone network and the IP network, comprising the steps of receiving a TCAP message, extracting the TCAP message, and encapsulating the TCAP message. The step of receiving a TCAP message comprises receiving a TCAP message from the public telephone network in an SS7 protocol format. Next, the method comprises a step of extracting the TCAP message from the SS7 protocol, and thereafter encapsulating the TCAP message in a second format, such that the TCAP message can be forwarded to the IP network to permit interworking therethrough. The method includes other embodiments that describe translating and encapsulating messages in various formats. The method describes the steps of processing messages in various formats, in converting those messages into a different format, such that TCAP messages can be exchanged between network nodes disposed in the IP network and in the public telephone network. As such, the aforementioned apparatuses, systems, and methods provide fully functional interworking between an IP network and a public telephone network by leveraging TCAP messages in compatible formats.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. Although specific terms are employed herein, they are used in a generic and descriptive sense only and not for purposes of limiting the scope of the present invention in any way.

Figure 1A:
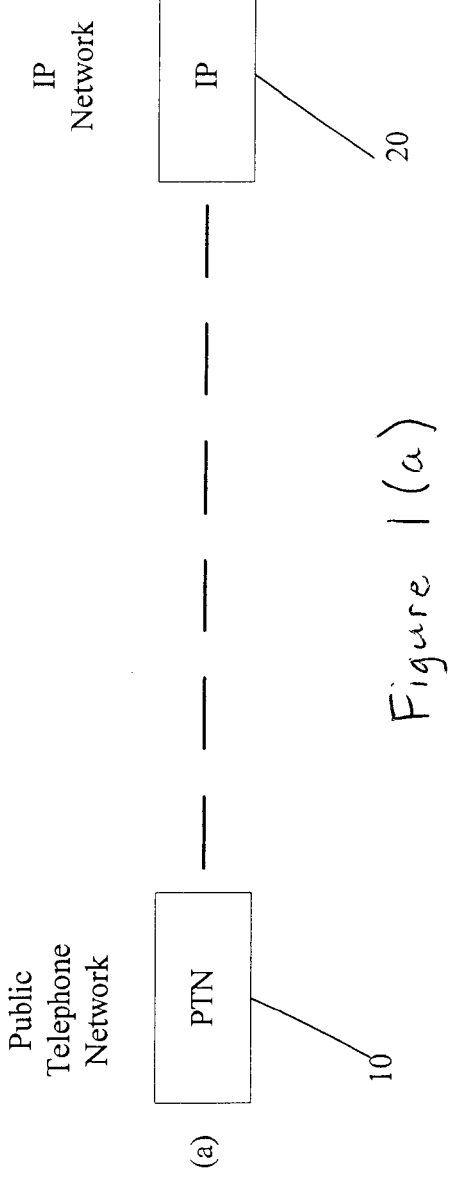
FIGS. 1(a) and 1(b) are block diagrams comparing the interface between the public telephone network and the IP network, prior to the present invention and according to one embodiment of the present invention, respectively.
Figure 1B:
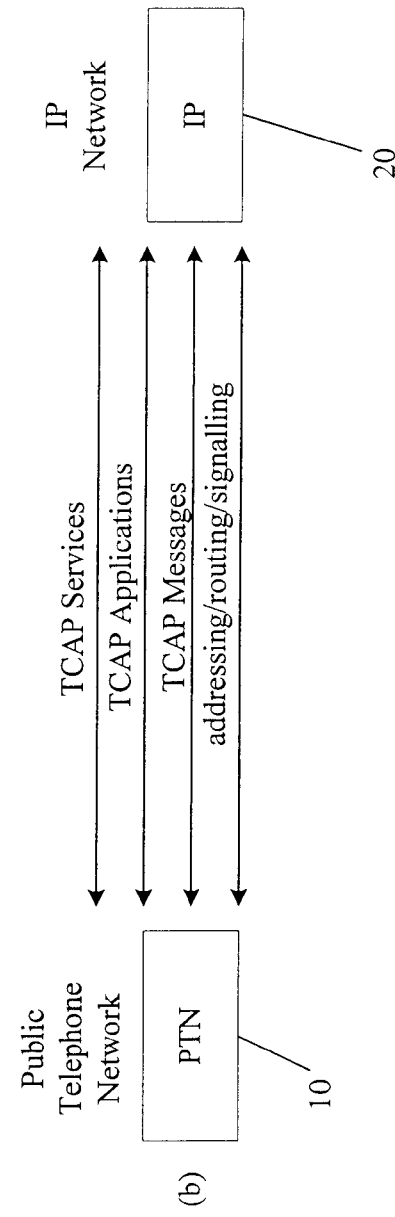

As described above, the public telephone network developed significantly earlier than the Internet Protocol (IP) network. Two separate and distinct network infrastructures evolved independently, as shown in FIG. 1(a). For some time, there was no gateway between the IP network 20 and the public telephone network 10. Eventually, the capability to establish a telephone call from an IP telephone terminal to a telephone terminal in the public telephone network was developed. This is shown by the dashed line between the public telephone network (PTN) and the IP network in the Figure. However, this capability only establishes an end to end connection between the respective networks, and as such, is of limited usefulness. The present invention provides fully functional advanced services interworking between the public telephone network and the IP network, as shown in FIG. 1(b). Different messaging formats, addressing, and routing found in the IP network and public telephone network are reconciled. Accordingly, TCAP messages are transported between network domains. TCAP software application programs operating in the public telephone network and IP network exchange and process TCAP messages. TCAP based services can therefore be exchanged between the IP network and public telephone network. Thus, advanced telephony services can be provided by the public telephone network, the IP network, or both. Interworking the divergent Internet and public telephone networks creates a cooperative processing environment for leveraging the capabilities of each respective network. For example, telephony services could be provided from the PTN network, the IP network, or both. The present invention provides apparatuses, systems, and related methods for providing true and fully functional interworking between the PTN public telephone network and the IP network.

Terminology

Discussion regarding the present invention will be facilitated by establishing the meaning of terminology to be used herein. Other terminology not expressly defined herein should be interpreted as the term is normally used by those skilled in the art.

Call Server/Controller (CS)

The Call Server performs signaling and call control functions for IP (Internet Protocol) clients, ie. Voice over IP telephones and Media Gateways. The Call Server can handle the registration and management of resources at the Media Gateway. In addition, the Call Server may authorize resource usage based on local policy, for example, based on the attributes of both the end user and the ISP (Internet Service Provider).

Directory Number (DN)

Telephone number or subscriber number associated with a telephone terminal.

Global Title Translation (GTT)

An SS7 routing function that translates a logical address to a physical SS7 address and possibly, a subsystem number, which identifies the application that will process the message whose address is being translated.

Home Location Register (HLR)

A database containing permanent and/or temporary information regarding the telephony services subscribed by, and the location of, a wireless telephone terminal serviced by the public telephone network.

IP network

Any network operating with the IP protocol, such as corporate intranets, local area subnetworks, other IP networks, or the public Internet network.

Internet network

A worldwide network of backbone interconnected computer networks, each including uniquely addressable, interconnected computers. The computers are interconnected by a communications medium through identical or compatible messaging formats, such that the respective computers can interact effectively and share information.

Internet Protocol (IP)

A worldwide standard messaging format or protocol used in the Internet network and any Internet Protocol (IP) network comprising network layer functions in the OSI model protocol stack.

Internet Service Provider (ISP)

Provider of access to the Internet and/or to services on the Internet Protocol networks.

ISDN User Part (ISUP)

The call control portion of the SS7 protocol, which is used between PTN switches to control all telephone calls.

Media Gateway (MG)

A Media Gateway terminates PTN facilities, such as trunks or loops, packetizes the media stream for the IP protocol if not already packetized, and delivers packetized traffic to the Internet/IP network. Examples of Media Gateways are NAS (Network Access Servers) and VoIP (Voice over IP) gateways. The NAS and VoIP functions may or may not be combined within the same gateway.

Message Transfer Part (MTP)

The lower three layers in the SS7 protocol, which provide physical, data link, and network functions. The network layer functions provide message routing between signaling points in the SS7 network. MTP is analogous to the lower three layers in the OSI model protocol stack.

Mobile Identification Number (MIN)

Telephone number or subscriber number associated with a wireless telephone terminal.

PTN (Public Telephone Network)

A public circuit switched telephone network, including landline, wireless, or both types of telephone network infrastructures. The PTN may include local telephone network components, long distance telephone network components, or both owned by a PTN service provider or carrier.

Service Control Point (SCP)

A node or network entity in the SS7 network and Intelligent Network that provides centralized service logic, serves as database, and provides call routing information.

Service Switching Point (SSP)

A switch node or switch network entity in the SS7 network that serves to originate, terminate, or tandem telephone calls by sending messages to other SSP's and/or SCP's.

Signaling Connection Control Part (SCCP)

The signaling layer in the SS7 protocol that provides a transfer capability for circuit related and non-circuit related signaling information.

Signaling System 7 (SS7)

A worldwide standard messaging format which defines the procedures and protocol used by network entities in the PTN network to exchange information over a digital out-of-band signaling network in order to setup, route, and control telephone calls and provide routing capabilities for wireless, Intelligent Network and other advanced services.

Signaling Transfer Point (STP)

A node or network entity in the SS7 network that serves as a packet switch and routes incoming messages based on routing information contained in an SS7 message. An STP may perform Global Title Translation.

Signaling Point (SP)

A network node in the SS7 network. It may be a signaling endpoint, signaling transfer point (STP), service switching point (SSP) or a service control point (SCP).

Simple TCAP Interworking Part (STIP)

A convergence protocol layer provided between the TCAP layer and the transport layer (e.g. TCP or UDP) in IP network, such that TCAP messages can be transported over the IP protocol layer in the IP network.

Subscriber

A customer who subscribes to telephony based services.

TCAP/IP Interworking Gateway (TIPG)

The network entity that provides a fully functional interface for exchanging TCAP messages between the PTN/SS7 network and the IP network, to support fully functional interworking therebetween.

Transaction Capabilities Application Part (TCAP)

Transaction Capabilities in the SS7 protocol are functions that control non-circuit related information transfer between two or more signaling nodes executing applications via a signaling network. Queries and responses between SSPs and SCPs are carried in TCAP messages. In the SS7 protocol, TCAP uses SCCP routing and addressing functions to send and receive messaging data.

Transmission Control Protocol (TCP)

A worldwide standard messaging format or protocol used in the IP network comprising transport layer functions in the OSI model protocol stack.

Visitor Location Register (VLR)

A database maintained by the wireless telephony network in a given location area which temporarily stores the information required to establish telephone calls to/from a wireless telephone terminal in that location area serviced by the public telephone network.

TCAP/IP Interworking Gateway Apparatus

Figure 2:
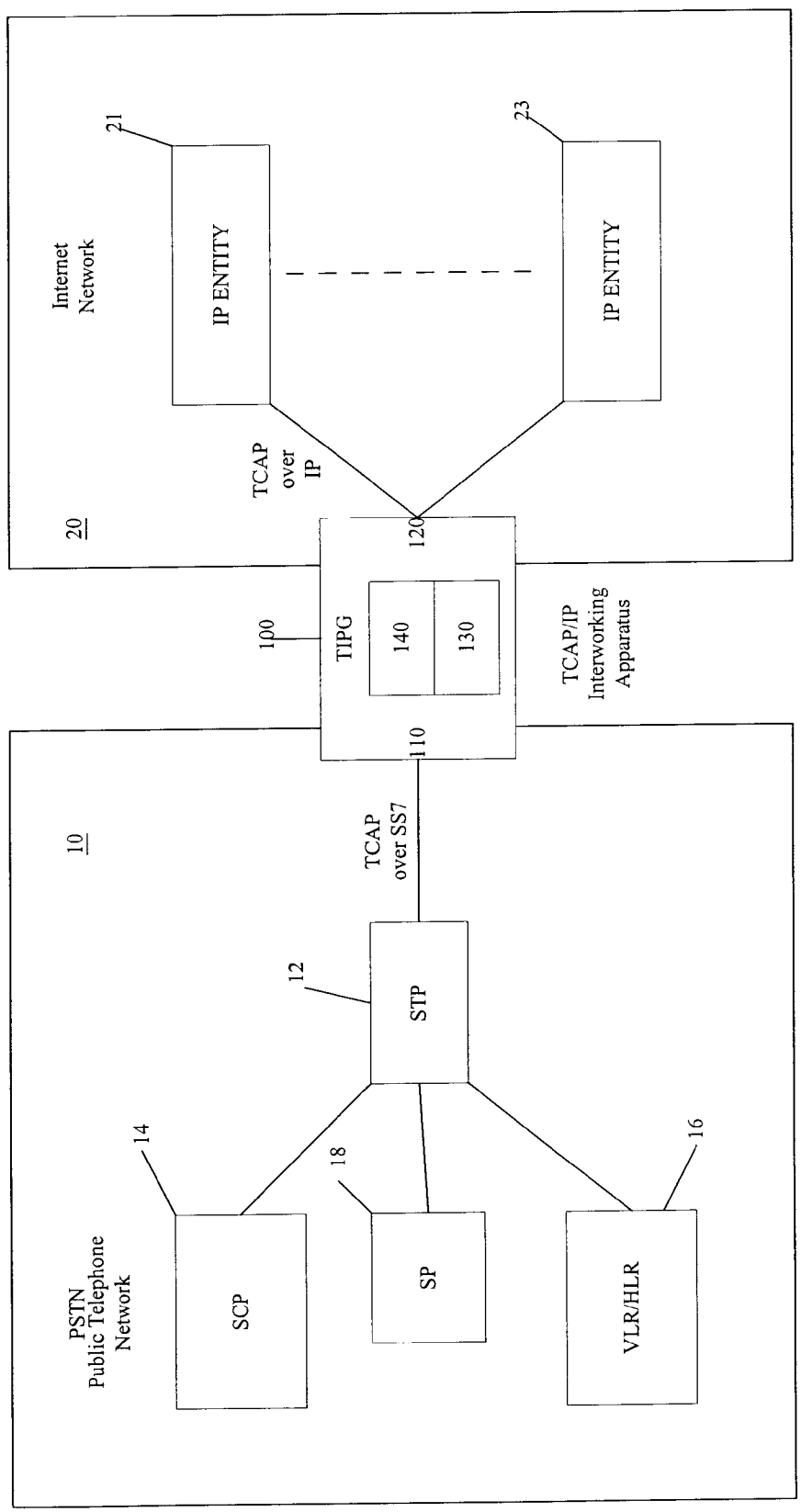
FIG. 2 is a block diagram illustrating an apparatus for interworking network entities in the IP network and the public telephone network, according to one embodiment of the present invention.

The present invention provides a TIPG (TCAP/IP Interworking Gateway) apparatus for fully interworking the IP network and the public telephone network. As shown in FIG. 2, the present invention provides a TIPG gateway apparatus 100 for selectively interworking a PTN/SS7 network 10 and an IP network 20. In one embodiment, the apparatus for selectively interworking comprises a first interface 110, a second interface 120, and a processor 130 operably connected to at least one of the first interface and the second interface. The PTN/SS7 network transmits and receives a TCAP message in a first format, such as a TCAP message over an SS7 format, while the IP network transmits and receives a second type of message in a second format, such as a TCAP message over an IP format. The first interface 110 is adapted for communicating with the PTN/SS7 network, and as such, is adapted for exchanging TCAP messages in the first format with the PTN/SS7 network. The second interface 120 is adapted for communicating with the IP network, and as such, is adapted for exchanging the second type of messages in the second format with the IP network. The second interface may also be adapted to exchange conventional TCP/IP messages with the IP network.

The processor 130 is adapted for translating the TCAP message received in the first format from the PTN/SS7 network, encapsulating the TCAP message in the second format, and forwarding the encapsulated TCAP message of the second type to the IP network. Preferably but not necessarily, the first format is an SS7 protocol format, the second format is an IP protocol format, and the second type of message is an encapsulated TCAP message. Similarly, the processor 130 may be further adapted for translating an encapsulated TCAP message received from the IP network in the second format, and forwarding a TCAP message in the first format to the PTN/SS7 network. The processor can be any microprocessor, microcontroller, or other computer processor capable of translating messages from one format to another. As such, the apparatus for selectively interworking can translate TCAP messages received from one of the IP network and the PTN/SS7 network, and forward a TCAP message in the proper format to the other of the IP network and the PTN/SS7 network. The apparatus accordingly provides an interworking capability between the Internet and PTN/SS7 network domains.

The apparatus for interworking may further comprise a storage memory 140 operably connected to the processor 130 such that the processor is responsive thereto. The storage memory can be used to store data and execute software application programs. Further, the storage memory is used for maintaining addressing and routing information relating to the PTN/SS7 network and the IP network. The storage memory can be part of the processor, such as internal cache memory or RAM. Alternatively, the storage memory may be disposed outside the processor but operably connected thereto, such as an external RAM, Disk, cache RAM, EEPROM, or some combination of these storage devices, and can be used to store addressing and routing data. More particularly, the storage memory can be organized to contain a table correlating a plurality of IP network node addresses and a plurality of PTN/SS7 network node addresses.

The processor 130 is used to remap an address of an incoming message received into one of the first interface and the second interface, prior to forwarding an outgoing message representative of the incoming message with a remapped address through the other of the first interface and the second interface. The addresses can be remapped in the processor, or the processor may have to access the storage memory in order to remap the addresses. Optionally, each Internet node address may comprise an IP address and a port number. For instance, IP entity 21 and IP entity 23 are each assigned a unique IP node address in the Internet, consisting of an IP address and a port number. Further, each PTN/SS7 network node is assigned with a destination point code. For example, PTN/SS7 network nodes SCP 14, SP 18, and VLR/HLR 16 are each assigned a unique SS7 address in the PTN/SS7 network consisting of a destination point code.

Addressing destination nodes in either network is managed by the processor 130 operating in conjunction with the addressing tables maintained in the storage memory 140 as described above. In the PTN/SS7 network, the well established SCCP Global Title Translation (GTT) function is used to determine the address of a destination node in the SS7 network. Based on the address mapping data, the GTT determines a destination node in the PTN/SS7 network and optionally a subsystem number of a destination application within the network node. The interworking apparatus extends the global title addressing concept to apply to addressing IP network nodes as well by extending the address translation table to include IP node addresses, such as an IP address and a port number. The Global Title Translation (GTT) function provided by a STIP application program executing in the interworking apparatus determines the destination address of an IP network node from an incoming TCAP message received from the PTN/SS7 network. The address translation functions performed when a message is received from the IP network or PTN/SS7 network will be described below.

The processor 130 in the interworking apparatus can be adapted to perform various functions in the respective networks. The processor can be adapted to serve as a signaling end point for the PTN/SS7 network, that is, only this interworking network node needs to be assigned with an SS7 point code and is known to the PTN/SS7 network. In the PTN/SS7 network, the processor can be further adapted to provide signaling transfer point (STP) functions, such as GTT functions, in PTN/SS7 network. In addition, the processor can be adapted to serve as a transit signaling point for the IP network, and provide GTT addressing and routing functions in the IP network. As such, the processor executes a software application program for carrying out these and other functions described herein.

Figure 3:
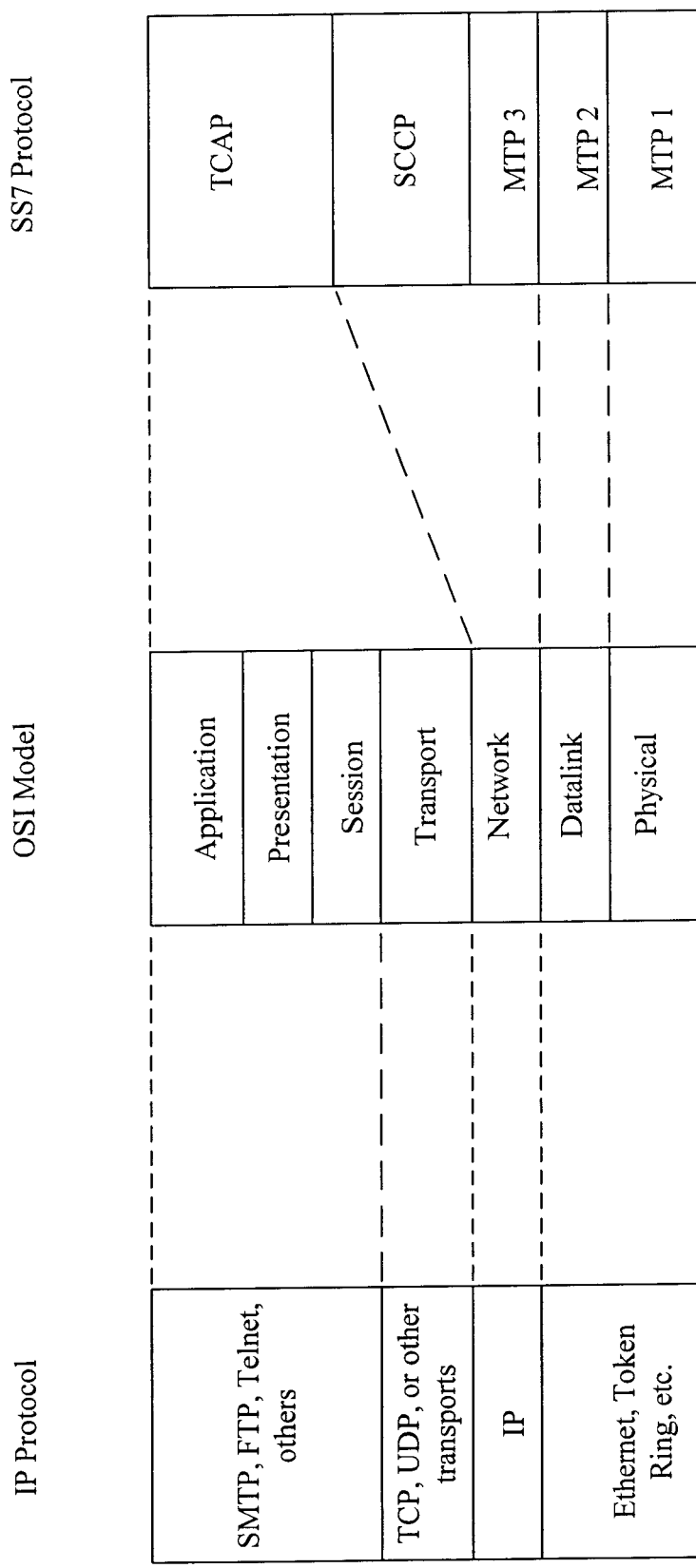
FIG. 3 is a diagram illustrating the messaging formats used in the Internet, OSI model, and public telephone network, respectively.

The incompatibilities in messaging formats used in the PTN/SS7 network and IP network are illustrated in FIG. 3. The protocol layer mappings shown in the figure are, of course, approximate. The IP network uses an IP messaging format that is substantially different from the SS7 protocol format used in the public telephone network. The IP messaging format or "protocol stack", OSI model protocol stack, and SS7 protocol stack are all shown in the Figure. The OSI model comprises seven layers denoted according to the function provided by each layer. For instance, the data link layer conveys messages along a local data link, while the network layer conveys messages along a network. The OSI model is used as a reference protocol stack at the center of the Figure, while the IP and SS7 protocol stacks are disposed on either side of the OSI model protocol stack. Dashed lines are drawn to show the rough correspondence between the functions in the OSI model layers and the corresponding functional layers in the IP and SS7 protocols. For IP, the lower two layers are implemented in a LAN (Local Area Network) such as Ethernet or Token Ring, or some other local data link, as shown. The IP (Internet protocol) layer comprises the network layer for the IP protocol stack. In contrast, for the SS7 protocol, the MTP level 3 and SCCP layer performs the OSI network layer functions. TCP, UDP, or another transport-like layer performs the transport functions for the IP protocol stack. IP resources such as SMTP, Telnet, etc. perform application layer functions, while some resources also perform at least some part of the presentation layer functions. In contrast, the TCAP layer in the SS7 protocol stack performs application functions. Given the differences in the distribution of protocol functions between the IP protocol layers and the SS7 protocol layers, it is apparent that significant message format transformations are required in order to provide fully functional interworking between the IP network and PTN/SS7 network.

Figure 4:
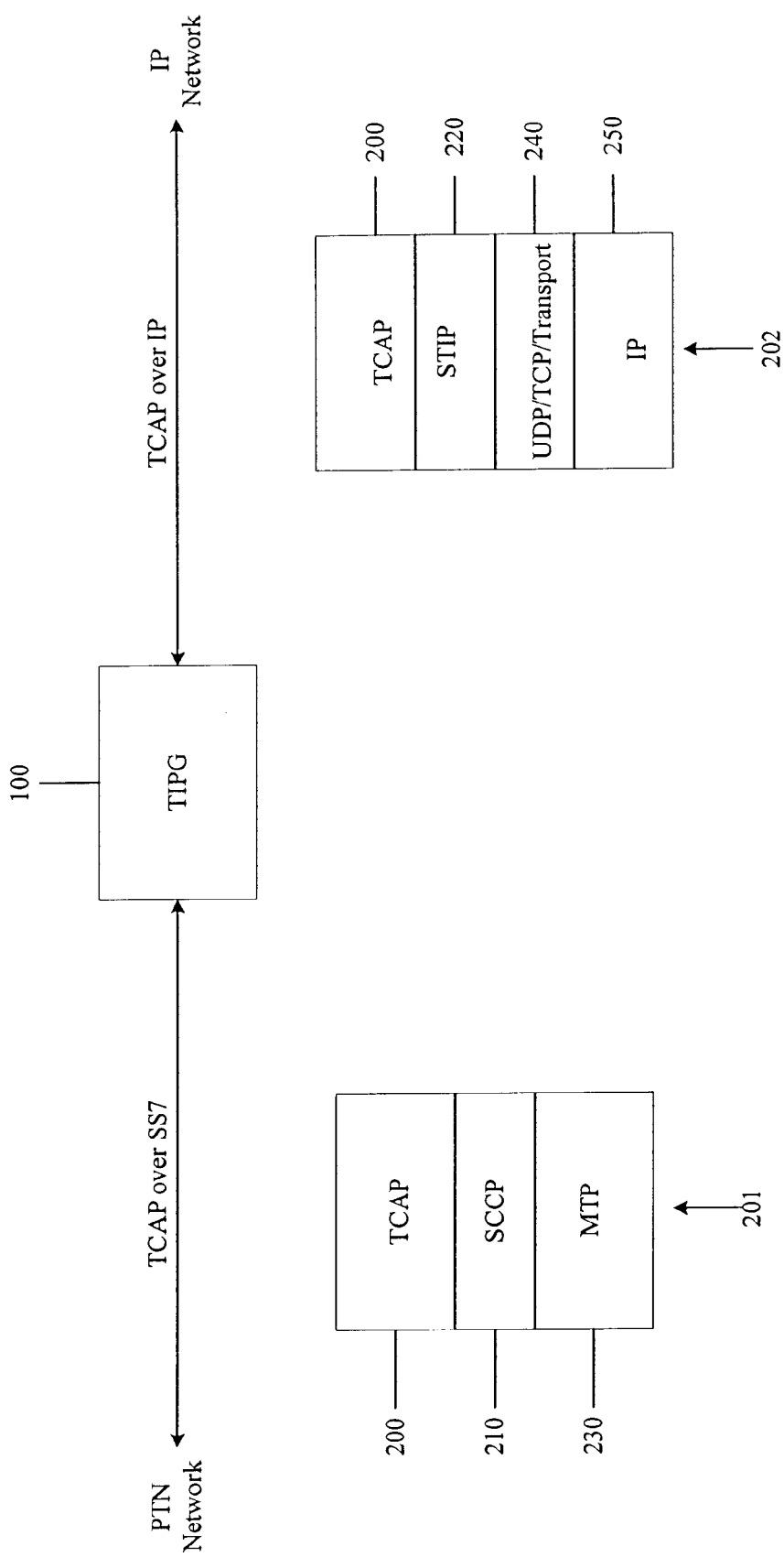
FIG. 4 is a block diagram illustrating an apparatus for interworking the IP network and the public telephone network, according to one embodiment of the present invention.
Figure 5:
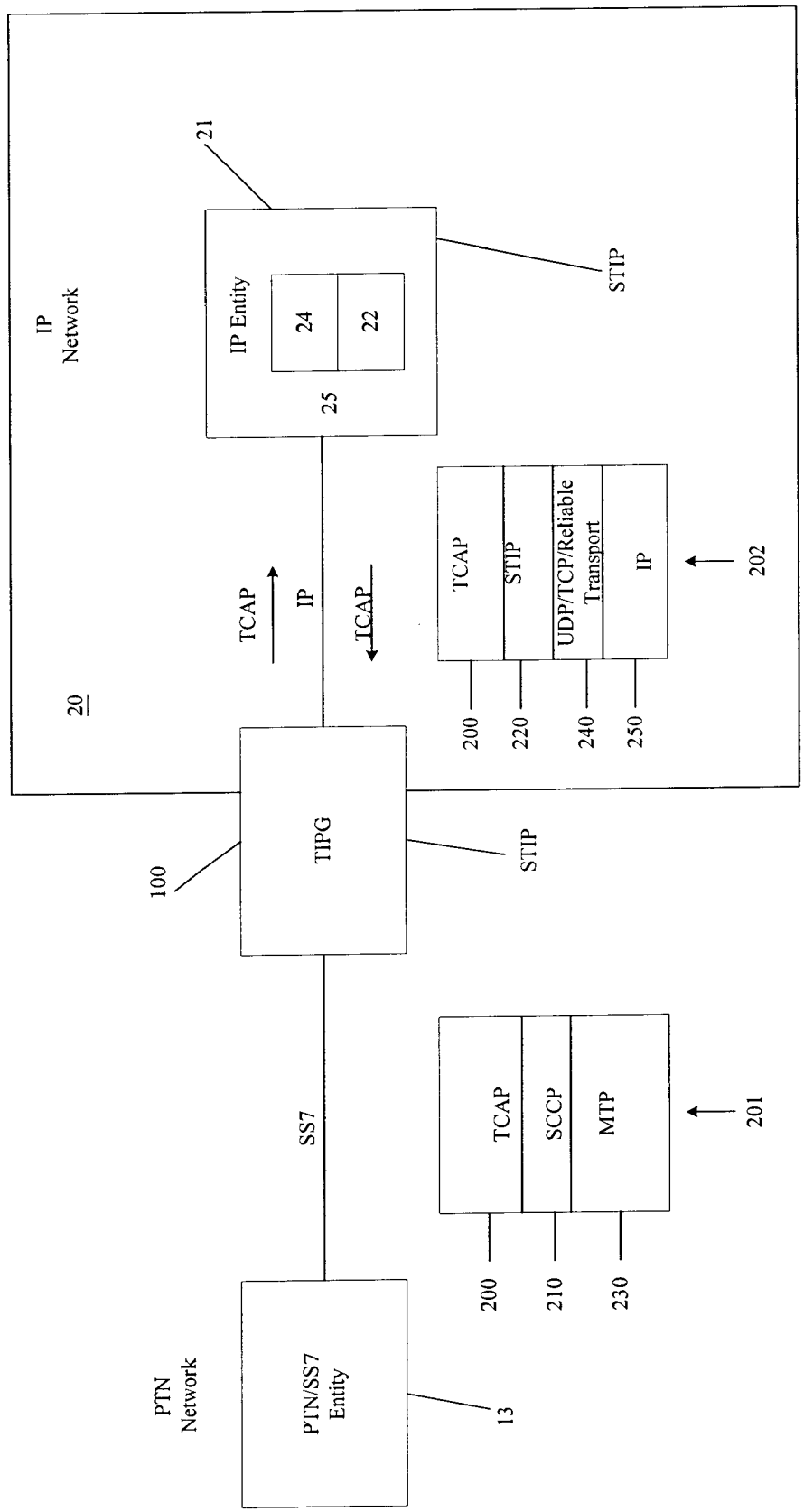
FIG. 5 is a block diagram illustrating a system for interworking network entities in the public telephone network and IP network, according to one embodiment of the present invention.

FIG. 4 provides more details regarding the apparatus for interworking. Messaging formats supported by the TIPG apparatus in the IP network and public telephone network (PTN) interface are illustrated. The processor can be adapted to provide SCCP addressing and routing to the PTN/SS7 network, and addressing and routing similar to, or approximate to, SCCP addressing and routing to the IP network. The processor can be adapted to execute a STIP software application program for processing encapsulated TCAP messages exchanged with the IP network. The STIP protocol layer provides addressing similar to SCCP addressing when TCAP messages are transported over the IP protocol in the IP network. In addition, the processor can also be adapted to translate the TCAP message received from the PTN/SS7 network in the first format into a second format suitable for transmission to the IP network, without altering the TCAP characteristics of the incoming message. For instance, the TCAP message 200 is transported in a first format 201 in the PTN/SS7 network, while the TCAP message 200 is transported in a second format 202 in the IP network, as shown. Since the translated TCAP message is forwarded to the IP network, the destination IP network entity or network node in the IP network preferably also executes a compatible STIP software application. For example, as shown in FIG. 5, STIP functions must be resident in the TIPG interworking apparatus 100 and in the IP network entity 21. As such, the translated TCAP messages received can be interpreted, while TCAP messages can be created and forwarded to the IP network and the interworking apparatus. The STIP software applications executing in the Internet IP entity and in the interworking apparatus could be identical, although this is not required. At a minimum, the STIP applications in the IP entity and interworking apparatus must work compatibly together.

As such, a TCAP message in the first format transmitted and received in the public telephone message comprises a TCAP portion 200, an SCCP portion 210, and an MTP portion 230, as shown. When the TCAP message is received from the PTN/SS7 network by the interworking apparatus, the processor translates the TCAP message from the first format 201 into the second format 202, that is, into an encapsulated TCAP message format. The encapsulated TCAP message in the second format comprises a TCAP portion 200, a STIP portion 220, and an IP portion 250, at least. Further, the encapsulated TCAP message may further include a transport portion 240, such as TCP, UDP, or another Internet transport portion, disposed between the STIP portion and the IP portion to serve as a transport layer in the IP network. After translation by the processor, the encapsulated TCAP message is transmitted to the IP network to be forwarded to the corresponding IP network destination node.

The interworking apparatus provides analogous translation capabilities for messages received in the second format from the IP.network. Accordingly, the interworking TIPG apparatus can transmit and receive messages in the first format and second format to either network. The processor can receive an encapsulated TCAP message in the second format from the IP network, and translate the received message into the first format suitable for transmission to the PTN/SS7 network, without altering the TCAP characteristics of the incoming message. The encapsulated TCAP message received from the IP network has at least a TCAP portion, a STIP portion, and an IP protocol portion. In addition, the encapsulated TCAP message may further include a transport portion as described above, disposed between the STIP portion and the IP protocol portion. After an encapsulated TCAP message is received from the IP network, the processor can translate the encapsulated TCAP message into the first format suitable for transmission to the PTN/SS7 network. The translated TCAP message in the first format comprises at least a TCAP portion, an SCCP portion, and an MTP portion, whether or not the encapsulated TCAP message included a transport portion. Once translated by the processor, the encapsulated TCAP message is transmitted to the PTN/SS7 network to be forwarded to the corresponding destination node in the PTN/SS7 network.

Address translation processing must be performed on an incoming message received from one network in order to forward a representative message to the destination in other network. When an incoming TCAP message is received from the PTN/SS7 network, the Internet destination node address is determined by analyzing the destination point code (DPC) and the called party address (CdPA) of the incoming SS7 TCAP message. If the DPC is the TIPG apparatus itself, the destination is a TCAP software application program executing in an IP network node, which can be an IP network entity or another TIPG apparatus. The Routing Indicator in the Called Party Address (CdPA) is used to determine the ultimate destination node in the IP network. If a subsystem number (SSN) routing is available, the message is forwarded to the IP network entity having the same SSN. If Global Title routing is used, STIP performs the GTT translation to obtain the address of the destination TIPG apparatus, and forwards the message there. If the DPC is not the TIPG apparatus itself, then the signaling transport function is requested. Thereafter, STIP retrieves the Internet node address, or IP address, of a far end TIPG apparatus and forwards the message there. In addition, since a reply message caused by the forwarded message may need to returned to the originating network node in the PTN/SS7 network, the STIP application records the DPC with the incoming IP address and port number when the message is sent to the far end TIPG apparatus. Over time, old DPC/IP/port number entries in the address table are overwritten or "aged out" if not used as frequently as other entries in the address table. If the TIPG apparatus is not the DPC, the SCCP Called Party Address (CdPA) and Calling Party Address (CgPA) fields from the incoming TCAP message received from the PTN/SS7 network are copied into the corresponding CdPA and CgPA fields in the STIP layer of the message to be forwarded to the IP network. However, if the SCCP CgPA field only contains a subsystem number, the DPC must be combined into the corresponding STIP CgPA field to permit the far end TIPG apparatus to send the message to a PTN/SS7 network connected thereto. Also, if the SCCP CgPA field only contains a subsystem number, the OPC parameter from the incoming TCAP message must be combined into the corresponding STIP CgPA field to permit the response message to be sent back to the originating network node.

When an incoming encapsulated TCAP message is received by the TIPG apparatus, the destination node address in the PTN/SS7 network must be determined by analyzing the received message. If the STIP CdPA (Called Party Address) indicates that Global Title routing is used, then Global Title Translation is performed by using the address translation table. If the destination address is an IP network address, then the message is forwarded on to the IP network entity. If the destination address is a point code in the PTN/SS7 network, then set the destination point code to the SS7 point code. That is, a TCAP message is sent from an application in IP network to an application in PTN/SS7 network. The STIP layer CdPA and CgPA fields from the encapsulated TCAP message received are copied into the SCCP layer CdPA and CgPA respectively. If the STIP CdPA field contains a point code explicitly and a subsystem number, the subsystem number is copied into the SCCP CdPA field and the point code is used as the destination point code for the MTP layer to route the message. If the STIP CdPA field indicates that Global Title routing is used, and the STIP CgPA field only contains a subsystem number, the message was originated from an IP entity. In this case, STIP adds the point code associated with the receiving TIPG apparatus into the SCCP CgPA field so that a response message can be sent back to the TIPG apparatus, if needed.

The present invention also provides another apparatus for selectively interworking the PTN/SS7 network and the IP network. The apparatus for interworking comprises means for communicating with the PTN/SS7 network, means for communicating with the IP network, and means for translating TCAP messages. The means for communicating with the PTN/SS7 network is adapted to exchange TCAP messages over the SS7 protocol with the PTN/SS7 network. In addition, the means for communicating with the IP network is adapted to exchange TCAP messages over the IP protocol format with the IP network. The means for translating a TCAP message is adapted to receive a message in the SS7 protocol format from the PTN/SS7 network, and to forward an encapsulated TCAP message in the IP protocol format to the IP network. Further, the apparatus for interworking may further comprise means for translating an encapsulated TCAP message received from the IP network and forwarding a TCAP message in the SS7 protocol to the PTN/SS7 network. Functionally, the apparatus for interworking includes all the networking, translating, and processing capability of the aforementioned interworking apparatus.

In operation, the interworking apparatus will receive an incoming TCAP message from one of the two interconnected networks. The format of the incoming message is analyzed to determine the originating network and network node, the destination network and network node, and what message processing will be required in order forward a message in the appropriate format to the ultimate destination node. As described, the incoming TCAP message will be translated such that the addressing, routing, and message format are correct for the network to which the TCAP message will be forwarded. Thereafter, the interworking apparatus is adapted to receive a reply or return message, and to forward the reply or return message back to the originating network node in the proper format.

Internet Entity Apparatuses

The present invention provides compatible IP network nodes or entities adapted for exchanging encapsulated TCAP messages with the IP network and/or the TIPG interworking apparatus. The IP network is adapted to transmit and receive the second type of message in the second format, as discussed. Therefore, an IP network entity apparatus complimentary in function to the TIPG interworking apparatus is required, such that TCAP messages in the second format can be exchanged and mutually interpreted to provide full interworking. The interrelationship between the TIPG interworking apparatus and the complimentary Internet entity apparatus is shown in FIG. 5. The present invention provides an Internet entity apparatus 21 for exchanging encapsulated TCAP messages with the IP network comprising a first interface for communicating with the IP network and a processor 22 operably connected to the first interface. The first interface 25 of the apparatus is adapted to communicate with the IP network 20, and exchange encapsulated TCAP messages in the second format with the IP network. In one embodiment, the second format is an IP protocol format and the second type of message is an encapsulated TCAP message. For instance, the IP protocol format and the protocol message format 202 as shown could be used. In addition, the first interface may be adapted to exchange conventional TCP/IP messages with the IP network, such as in the IP format.

The processor 22, being operably connected to the first interface 25, is adapted to extract a TCAP message from an encapsulated TCAP message in the second format received from the IP network. Further, the processor is adapted to encapsulate a TCAP message and forward the encapsulated TCAP message in the second format to the IP network through the first interface. As such, encapsulated TCAP messages and conventional IP messages can be exchanged between the apparatus and the IP network as shown. The apparatus may further include a storage memory 24 as described above operably connected to the processor, for storing data, network related information, and/or software application programs. In one advantageous embodiment, the processor can be adapted to execute one or more TCAP software application programs. As such, TCAP messages received by the apparatus can be processed by the application program, and TCAP messages can be originated by the TCAP application program and transmitted to the IP network.

In addition, the processor can be adapted to execute a STIP software application program, as shown, such that SCCP primitives can be provided to the TCAP software application in order to send and receive TCAP messages therewith. The STIP software application program can be identical to the STIP software executing in the TIPG apparatus 100, if desired. However, the only requirement is that the STIP software application program executing in the Internet entity apparatus 21 be compatible with the TIPG STIP software application program. STIP provides addressing and routing functions for TCAP applications executing in the Internet entity apparatus. The addressing and routing used is the same as that provided by the STIP software application program within TIPG. However, since the Internet entity apparatus 21 is not an SS7 network entity, it does not require an SS7 point code and therefore does not utilize any point code sent to it from a TIPG apparatus. In addition, STIP executing in the Internet entity apparatus provides the same three SCCP primitives provided by the SS7 network to a TCAP application, such as N-UNITDATA request, N-UNIT DATA indication, and N-NOTICE indication primitives. Since telephony services can be provided by exchanging TCAP messages, the processor may accordingly be further adapted to provide telephony services to the IP network and to an interworked PTN/SS7 network by exchanging encapsulated TCAP messages with the IP network.

When incoming encapsulated TCAP messages are received by the Internet entity apparatus 21, the routing indicator in the CdPA STIP field must be set to subsystem number routing. The message is then passed to the TCAP application using the N-UNITDATA indication primitive with CdPA, CgPA, and TCAP data parameters. When outgoing messages are to be sent from the Internet entity apparatus 21, the STIP software application program obtains data parameters from the TCAP application using the N-UNITDATA request primitive with CdPA, CgPA, and TCAP data parameters. The addressing information added to the outbound TCAP message comprises either a destination point code and a subsystem number (from the STIP CgPA field of the received message) or a Global Title. The TCAP application may or may not provide CgPA, so the CgPA is defined to be the same subsystem number as that is assigned to the TCAP application. Eventually, STIP forwards the message in the second message format to some interconnected TIPG interworking apparatus.

The present invention further provides an apparatus for exchanging encapsulated TCAP messages with the IP network comprising means for communicating with the IP network and means for translating. The means for communicating with the IP network is adapted to exchange encapsulated TCAP messages over the IP protocol with the IP network. The means for translating is operably connected to the means for communicating, and is adapted to extract a TCAP message from an encapsulated TCAP message received from the IP network through the means for communicating. The means for translating is further adapted to encapsulate a TCAP message and forward an encapsulated TCAP message to the IP network, also through the means for communicating. Thus, the apparatus can exchange encapsulated TCAP messages with the IP network. Functionally, the apparatus for exchanging encapsulated TCAP messages includes all the networking, translating, and processing capability of the earlier mentioned Internet entity apparatus 21 for exchanging encapsulated TCAP messages with the IP network.

In one embodiment, the apparatus for exchanging TCAP messages with the IP network can further comprise a translation device. The translation device has an IP network interface for communicating therewith, and a PTN/SS7 network interface for communicating therewith. The apparatus is operably connected to the translation device through the IP network interface, and the translation device is operably connected to the PTN/SS7 network through the PTN/SS7 network interface. The translation device provides functions analogous to a TIPG interworking apparatus local to the Internet entity apparatus 21, such that a connection to the PTN/SS7 network can be established without a remote TIPG interworking apparatus. As such, the translation device is adapted for receiving an encapsulated TCAP message from the apparatus through the IP network, and forwarding a representative TCAP message to the PTN/SS7 network. Further, the translation device is adapted to receive a TCAP message from the PTN/SS7 network and forward a representative encapsulated TCAP message to the apparatus through the IP network. As such, encapsulated TCAP messages can be exchanged between the apparatus and the PTN/SS7 network through the translation device and the IP network. The functions provided by the translation device may be implemented in one or more VLSI hardware devices. Alternatively, the translation device may comprise a processor, storage memory, and application software programs as necessary in order to carry out the aforementioned functions. The translation device in effect performs at least part of the interworking functions of the TIPG interworking apparatus 100, local to the Internet entity apparatus.

In operation, the Internet entity apparatus will receive an encapsulated TCAP message from a TIPG apparatus through the IP network. The incoming message is analyzed to determine what message processing will be required. As described, the incoming TCAP message will preferably be processed and utilized by a TCAP application, such as calling card billing verification. In addition, the TCAP application can originate a message to be sent to a TIPG apparatus. The STIP application is used to retrieve and format the outbound TCAP message. Thereafter, the encapsulated TCAP message is forwarded to a TIPG interworking apparatus through the IP network.

IP/PTN Interworking Systems

The present invention provides various systems for interworking the public telephone network and the IP network. As such, the present invention provides a system for selectively interworking a public telephone network and an IP network, comprising a first network node, a second network node, and at least one interworking apparatus operably connected to at least one of the first network node and the second network node. For example, the first network node could comprise a PTN network node 13, the second network node could comprise an Internet entity apparatus 21, such as a call server or an IP services server, and the interworking apparatus could comprise TIPG 100 in one system, as shown in FIG. 5. In an advantageous embodiment, the first network node and second network node each execute a TCAP software application program, such that TCAP messages and associated services can be exchanged between the first and second network nodes.

Figure 6:
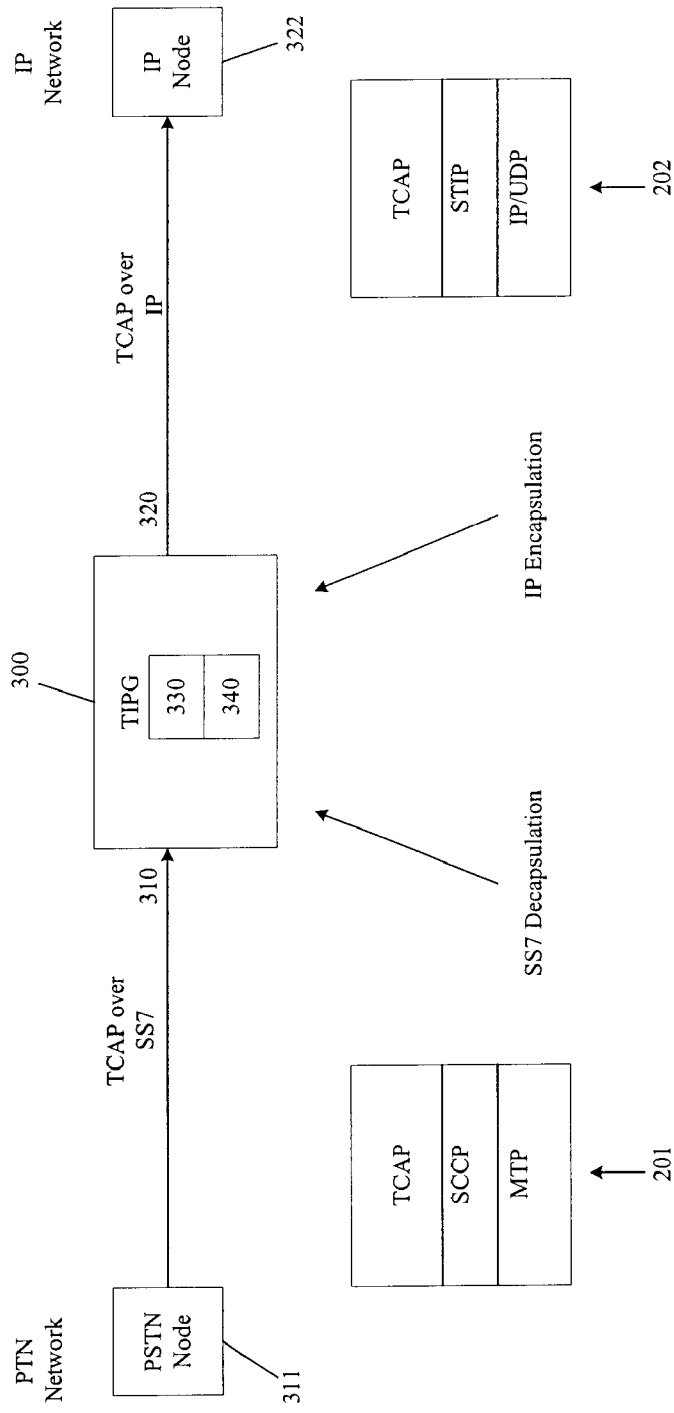
FIG. 6 is a diagram illustrating the TCAP message translations performed by the interworking apparatus to interface the public telephone network to the IP network, according to one embodiment of the present invention.

FIG. 6 illustrates another example of a system for interworking the IP network and the public telephone network. Each interworking apparatus within the system, such as TIPG 300, further comprises a first interface 310, a second interface 320, and a processor 330 operably connected to the first interface and the second interface. In this Figure, the first network node 311 and the second network node 322 are operably interconnected through TIPG 300, although the network nodes are disposed in the public telephone network and IP network respectively. As such, the first interface 310 is adapted for communicating with the public telephone network, and is adapted to exchange TCAP messages in a first format with the public telephone network. In addition, the second interface 320 is adapted for communicating with the IP network, and is adapted to exchange IP messages in a second format with the IP network. The processor 330 is adapted for extracting a TCAP message received in the first format from the public telephone network, and forwarding an encapsulated TCAP message in the second format to the IP network. Further, the processor is adapted to translate an encapsulated TCAP message received from the IP network in the second format, and forwarding a TCAP message in the first format to the public telephone network. Optionally, the processor may be operably connected to storage memory 340, to support interworking by providing message translations and application software program execution as previously described. The first format can be the SS7 protocol format used in the public telephone network, while the second format can be the IP protocol format used in the IP network. For instance, the first format could be the SS7 protocol stack 201, while the second format could be the encapsulated TCAP over IP protocol stack 202, as shown.

Figure 7:
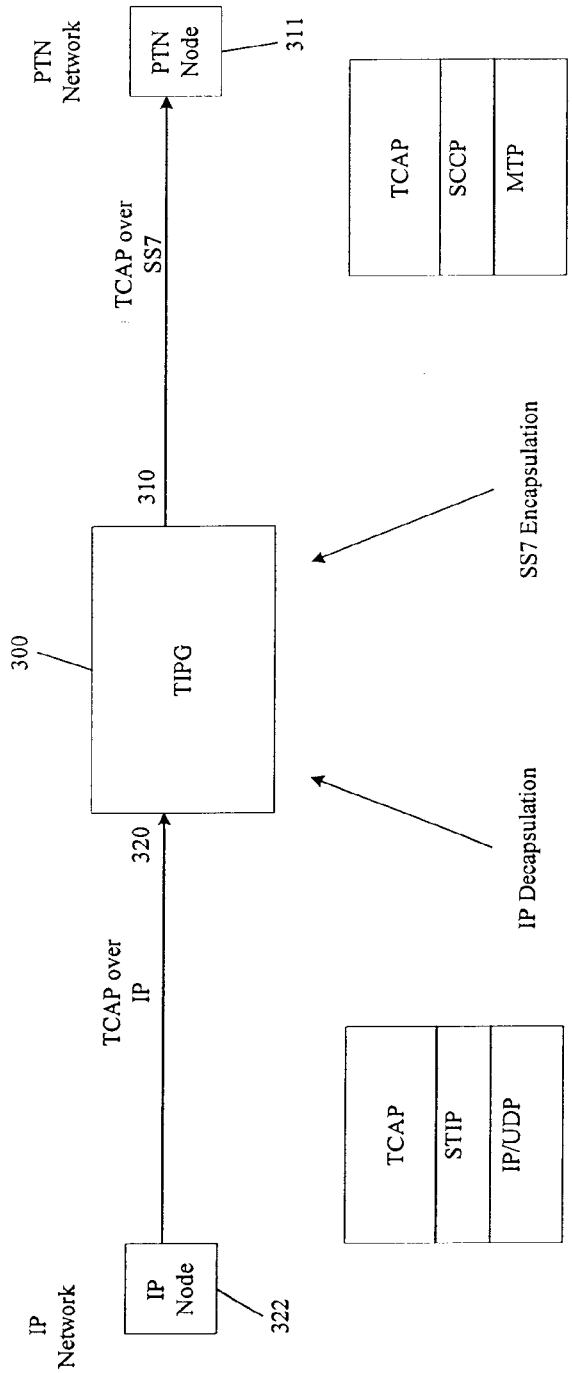
FIG. 7 is a diagram illustrating the TCAP message translations performed by the interworking apparatus to interface the IP network to the public telephone network, according to one embodiment of the present invention.

In the embodiment of the system shown in FIGS. 6 and 7, the first network node comprises part of the public telephone network, and is operably connected to the first interface. In addition, the second network node of the system comprises part of the IP network, and is operably connected to the second interface. The first network node and second network node in different network domains are connected to, and through, at least one interworking apparatus. Accordingly, this system establishes interworking between a network node in the IP network and a network node in the public telephone network. In a further embodiment of the system, the first network node and second network node each further comprise a processor. In addition, when the first format is an SS7 protocol format, the processor in the first network node is adapted to exchange TCAP messages in the SS7 protocol with at least one interworking apparatus. Further, the processor in the second network node is adapted to exchange encapsulated TCAP messages with at least one interworking apparatus. The first network node and second network node in different network domains can thereby exchange TCAP messages through at least one interworking apparatus. Further, each processor can be adapted to execute a TCAP application software program, such that the TCAP application software programs in the first network node and in the second network node can communicate through at least one interworking apparatus. As described above, advanced services can be established to utilize service infrastructures in different network domains because TCAP messages are transported efficiently across network domains by the interworking apparatus. FIG. 6 illustrates transporting a TCAP message from the public switched telephone network to a destination node in the IP network, while FIG. 7 shows transporting an encapsulated TCAP from an IP node to the public telephone network.

Figure 8:
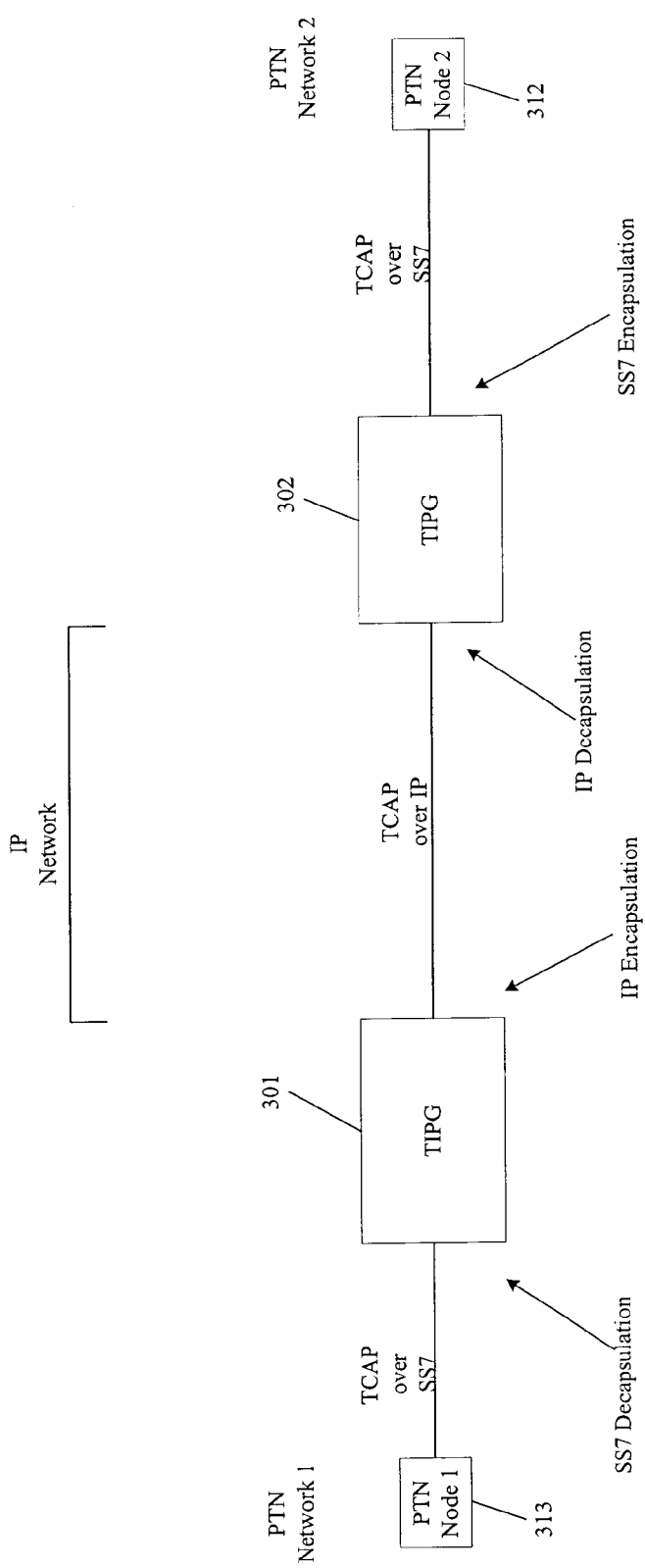
FIG. 8 is a block diagram illustrating a system for interworking two public telephone networks through the IP network by using two interworking apparatuses, according to one embodiment of the present invention.

One embodiment of the system for selectively interworking the public telephone network and the IP network comprises a first interworking apparatus and a second interworking apparatus. FIG. 8 shows one example of this system embodiment. The first interworking apparatus, such as 301 for example, is operably connected to the first network node, such as 313. Analogously, the second interworking apparatus, such as 302, is operably connected to the second network node, such as 312. In addition, the first interworking apparatus and second interworking apparatus are operably connected, such that the first network node and the second network node are thereby connected to each other. In another embodiment, the first network node comprises part of a first public telephone network, such as PTN network 1, and the second network node comprises part of a second public telephone network, such as PTN network 2. Further, the first interworking apparatus and the second interworking apparatus are operably connected through the IP network. As such, the first network node and the second network node are operably connected and interworked through the first interworking apparatus and the second interworking apparatus.

In other words, two public telephone networks, such as PTN network 1 and PTN network 2, are interconnected through the IP network by using a pair of interworking apparatuses.

Figure 14:
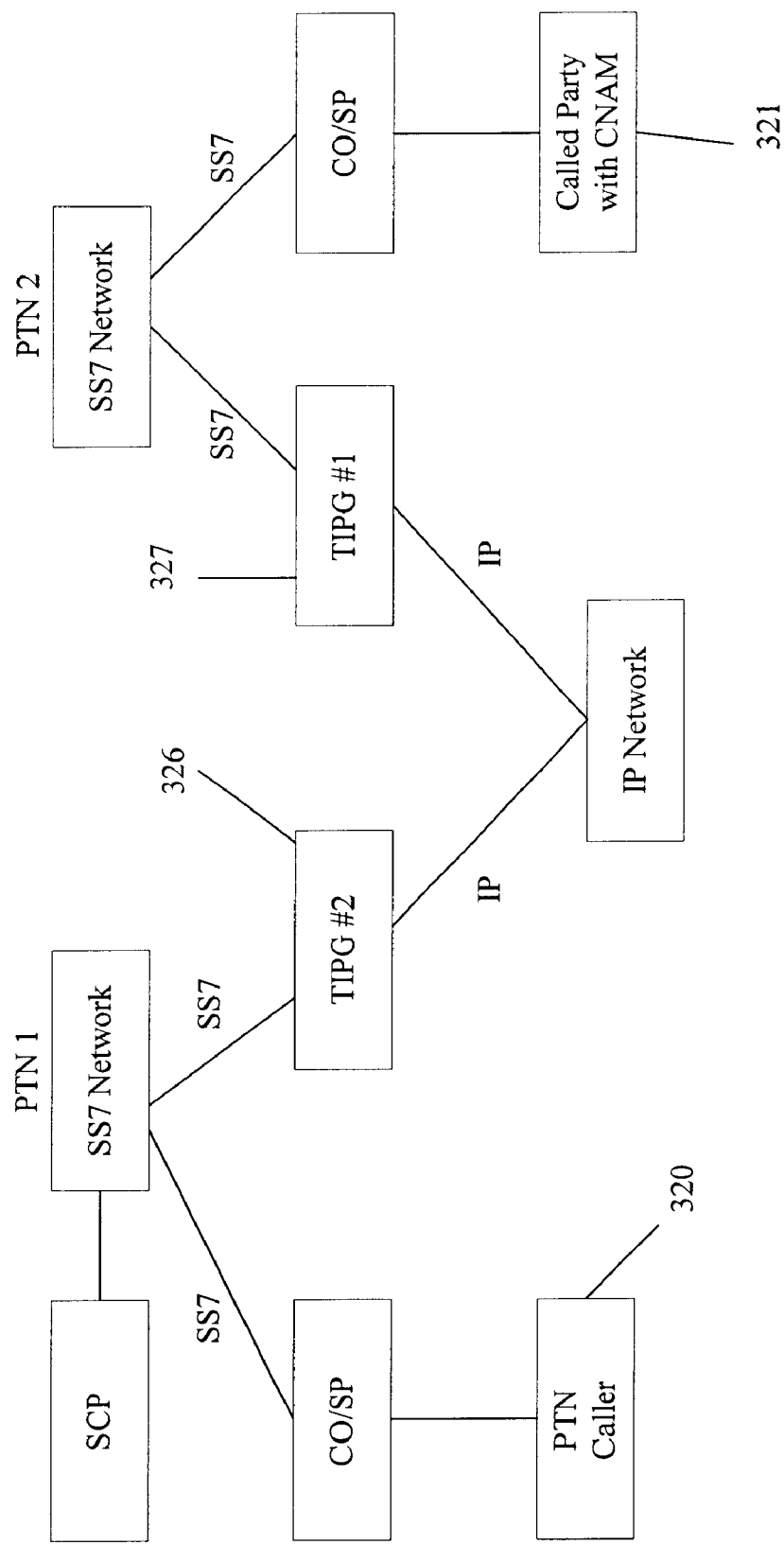
FIG. 14 is a block diagram illustrating a system for interworking two public telephone networks and an IP network through two interworking apparatuses for providing signaling transport functions between the public telephone networks, according to one embodiment of the present invention.

In addition, the first interworking apparatus and second interworking apparatus can be adapted to provide signaling transport functions between the first public telephone network and the second public telephone network. An example of this system configuration is illustrated in FIG. 14. A first network node, such as 320, is operably connected to a first public telephone network, such as PTN 1 as shown. A second network node, such as 321, is operably connected to a second public telephone network, such as PTN 2. In addition, the respective public telephone networks are operably interconnected through the IP network, such as the IP network shown, through a pair of interworking apparatuses, such as 326 and 327. As such, signaling may be transported from the first public telephone network to the second public telephone network through the IP network by leveraging the capabilities of a pair of interworking apparatuses as configured. Thus, not only basic Voice over IP call can be established, advanced services can be provided.

Figure 10:
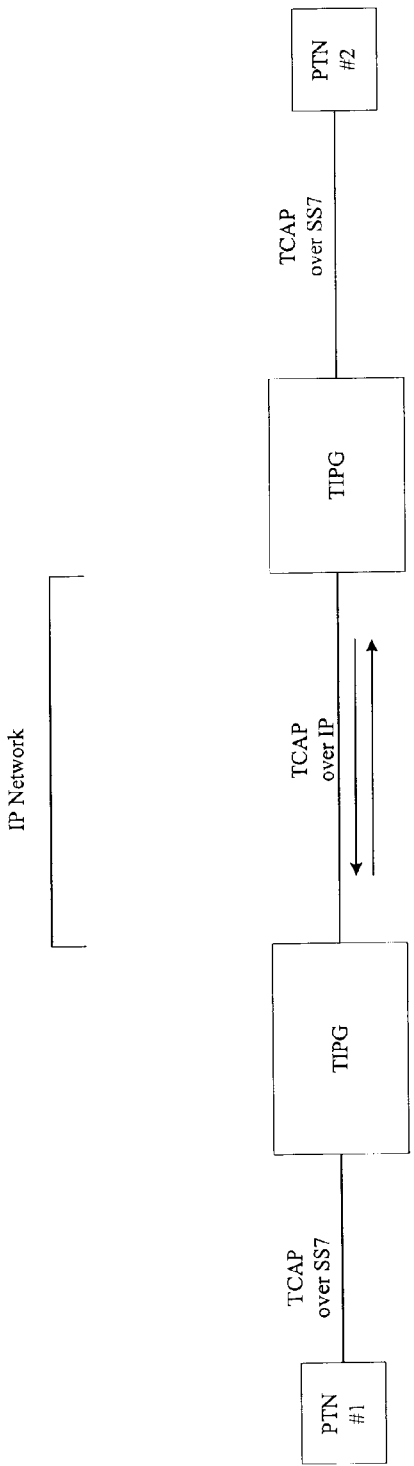
FIG. 10 is a block diagram illustrating a system for interworking two public telephone networks and an IP network through two interworking apparatuses for transporting telephony functions between the public telephone networks, according to one embodiment of the present invention.

Further, as shown in FIG. 10, paired interworking apparatuses can be used to exchange telephony based services and functions between different public telephone networks. The first interworking apparatus and second interworking apparatus can exchange at least one telephony function between the first public telephone network and the second public telephone network. For instance, telephony functions such as calling name delivery, local number portability, automatic recall, automatic callback, and the like can be provided from one public telephone network to another. The first and second public telephone networks can be different networks, such as telephone networks operated by different carriers of telephony service providers. In addition, the first and second public telephone networks can comprise different portions of the same public telephone network.

Figure 9:
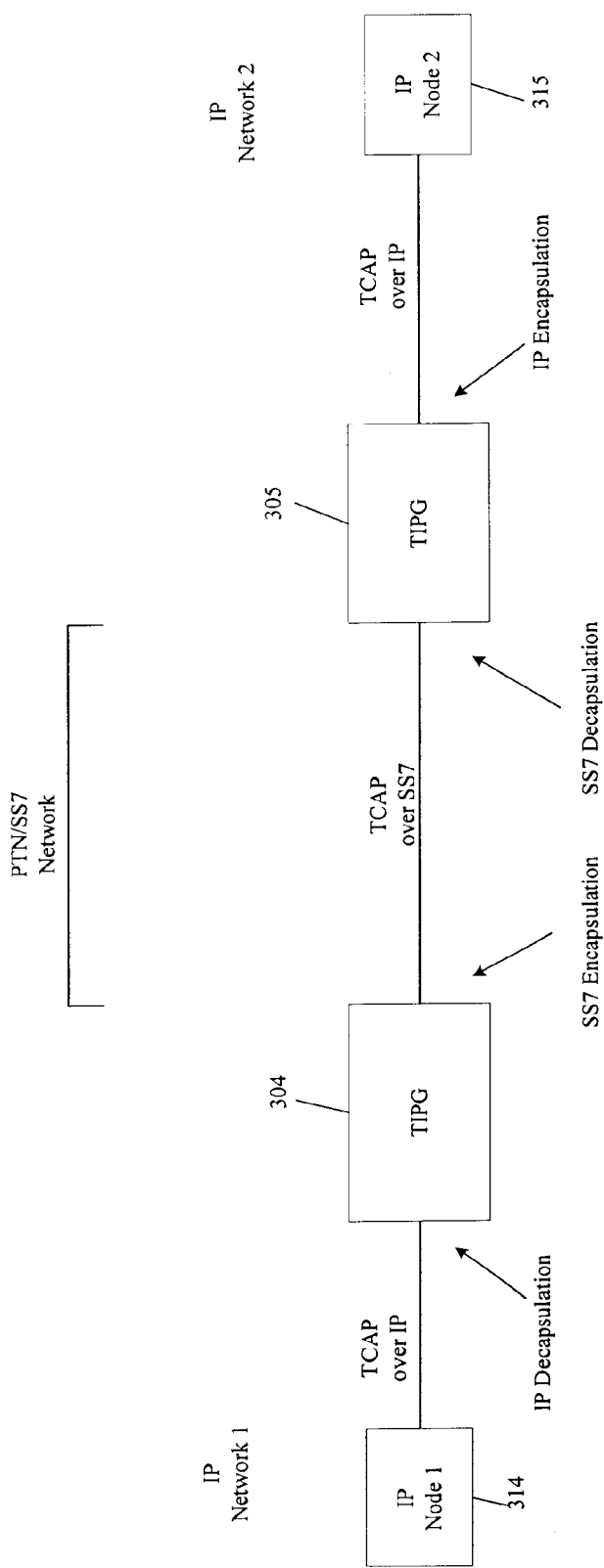
FIG. 9 is a block diagram illustrating a system for interworking two IP networks through the public telephone network by using two interworking apparatuses, according to one embodiment of the present invention.

Another embodiment of the system for selectively interworking the public telephone network and the IP network leverages the first interworking apparatus and the second interworking apparatus in a different manner. In this embodiment, the first network node comprises part of a first IP network, while the second network node comprises part of a second IP network. An example of this system configuration is shown in FIG. 9. The first interworking apparatus and second interworking apparatus are operably connected through a public telephone network, such that the first network node and second network node are operably connected through the first interworking apparatus and second interworking apparatus. In effect, two IP networks are interconnected through a public telephone network through the pair of interworking apparatuses. Two different IP networks can be interconnected, or two different portions of the same IP network can thus be interconnected.

Figure 11:
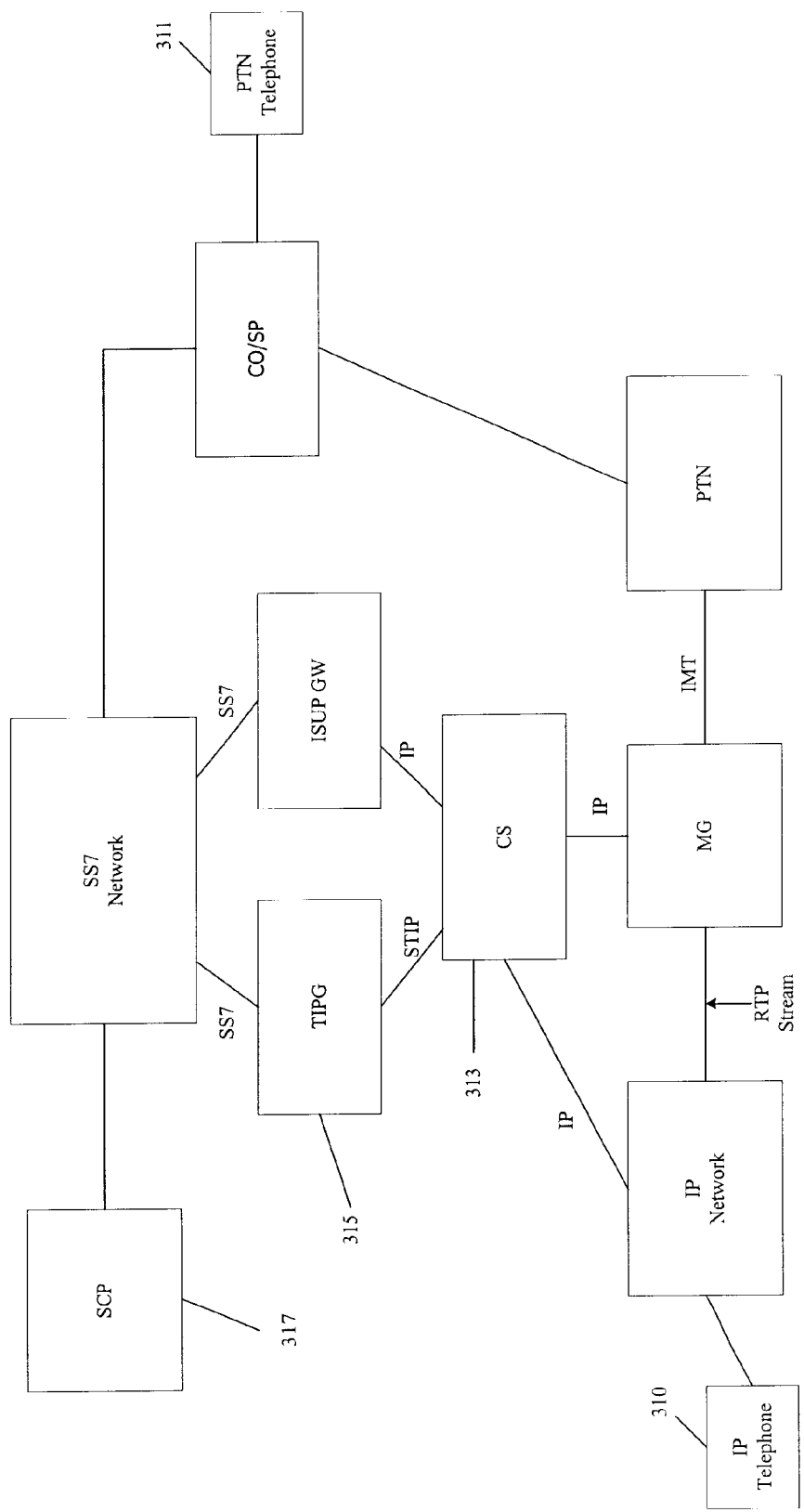
FIG. 11 is a block diagram illustrating a system for interworking an IP network and a public telephone network for providing voice over IP services through an interworking apparatus, according to one embodiment of the present invention.

A further embodiment of the system for selectively interworking the public telephone network and the IP network is shown in FIG. 11. In this embodiment, the first network node, such as 311, comprises a telephone terminal operably connected to the public telephone network. In addition, the second network node, such as 310, comprises an Internet telephone terminal operably connected to the IP network. At least one interworking apparatus, such as 315, serves to interconnect an IP Call Server, such as 313, and an SS7 SCP, such as 317. Accordingly, the IP telephone terminal can place a telephone call through the IP network to the public telephone network. As such, Intelligent Network services on Voice over IP calls can be provided by leveraging the interworking apparatus in this system.

Figure 12:
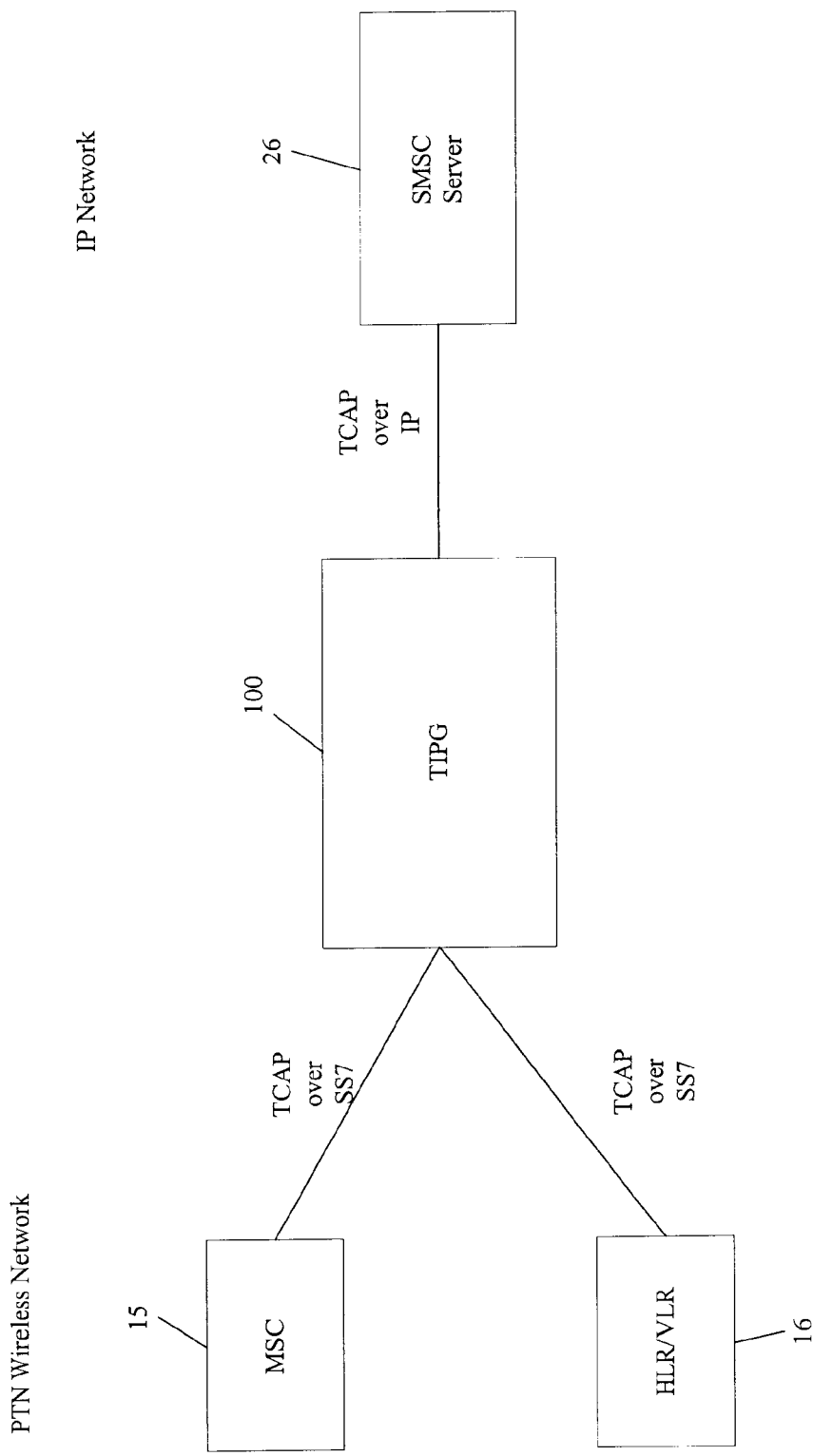
FIG. 12 is a block diagram illustrating a system for interworking an IP network and a public telephone network for providing short message services through an interworking apparatus, according to one embodiment of the present invention.

As shown in FIG. 12, another embodiment of the system for selectively interworking the public telephone network and the IP network can be configured to provide short message services to the public telephone network wireless subscribers. In this embodiment, the first network node, such as 15 or 16, comprises a public telephone network node operably connected to the public telephone network for wireless services including the short message service. The second network node, such as 26, comprises a short message services server operably connected to the IP network. In addition, at least one interworking apparatus, such as TIPG interworking apparatus 100, is used to interconnect the first network node and the second network node. As such, the IP network based short message services server provides short message services to the public telephone network wireless subscribers. In other words, an IP network server can be used to provide short message services to the public telephone network through the interworking apparatus.

Figure 13:
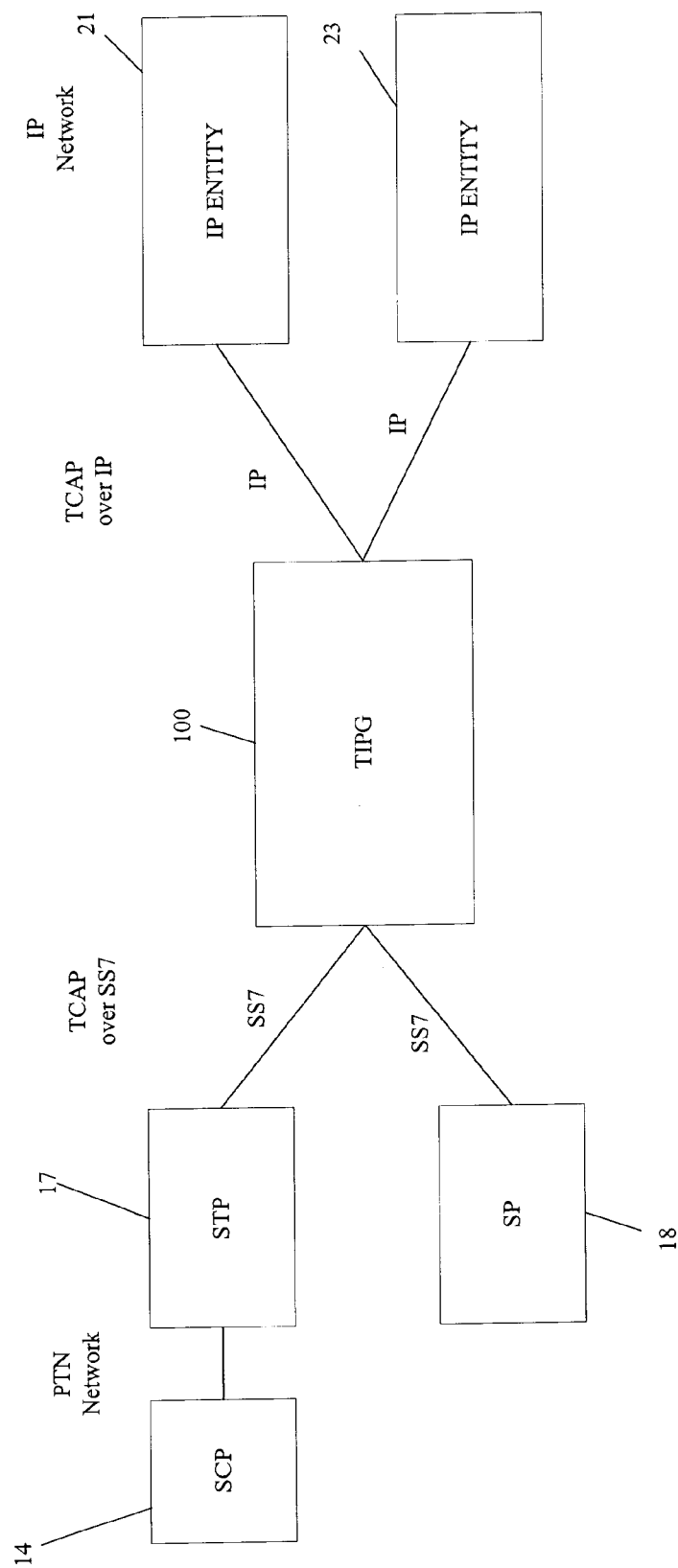
FIG. 13 is a block diagram illustrating a system for interworking an IP network and a public telephone network for providing telephony services from the IP network through an interworking apparatus, according to one embodiment of the present invention.

One embodiment of the system for selectively interworking the public telephone network and the IP network can be configured to provide telephony based services to the public telephone network. An example of this embodiment is illustrated in FIG. 13. For this embodiment, the first network node, such as nodes 14, 17, or 18, comprises a public telephone network node operably connected to the public telephone network. The second network node, such as IP entities 21 or 23, comprises a services server operably connected to the IP network. At least one interworking apparatus, such as TIPG interworking apparatus 100, serves to interconnect the first network node and second network node, so as to permit the newly developed services servers in the IP network to provide advanced services to the public telephone network. Accordingly, an IP network server can be used to provide advanced services to the public telephone network, through the TIPG interworking apparatus.

In one further embodiment, the present invention provides a system,for selectively interworking the public telephone network and the IP network comprising a first network node, a second network node, and at least one interworking apparatus operably connected to at least one of the first network node and the second network node. In this embodiment, each interworking apparatus further comprises means for communicating with the public telephone network, means for communicating with the IP network, and means for translating. The means for communicating with the public telephone network is adapted to exchange TCAP messages over the SS7 protocol format with the public telephone network. In addition, the means for communicating with the IP network is adapted to exchange TCAP messages over the IP protocol format with the IP network. The means for translating is operably connected to at least one of the means for communicating with the public telephone network and the means for communicating with the IP network. Further, the means for translating is adapted to translate a TCAP message received in the SS7 protocol format from the public telephone network, and thereafter forward an encapsulated TCAP message over the IP protocol format to the IP network. The means for translating is also adapted to translate an encapsulated TCAP message from the IP network, and thereafter forward a TCAP message in the SS7 protocol format to the public telephone network. Functionally, the interworking apparatus of this system includes all the networking, translating, and processing capability of the aforementioned TIPG and related aforementioned interworking apparatuses.

TCAP/IP Interworking Method

The present invention likewise provides a method for selectively interworking the public telephone network and the IP network. The method provided by the present invention initially comprises the step of receiving a TCAP message in a first format from the public telephone network. Next, the method comprises the steps of extracting the TCAP message from the first format, and thereafter encapsulating the TCAP message in a second format, such that the TCAP message can be forwarded to the IP network and permit interworking therethrough. In addition, the first protocol format can be an SS7 protocol format, while the second format can be an IP protocol format.

In one embodiment, the method may further comprise the step of transmitting the encapsulated TCAP message to a network node in the IP network, after the encapsulating step. Further, the method may include the step of decapsulating the encapsulated TCAP message received by the network node in the IP network, to thereby permit recovery of the original TCAP message. A further embodiment of the method defines the second format as an IP protocol format, and further comprises the steps of encapsulating a TCAP message, and transmitting the encapsulated TCAP message. The encapsulating step encapsulates a TCAP message originating in the network node in the IP network in an IP protocol format, such that the TCAP message can be forwarded through the IP network. The transmitting step thereafter transmits the encapsulated TCAP message to the IP network. In addition, the method can thereafter further comprise additional steps.

The method can further include the step of receiving an encapsulated TCAP message at a second network node in the IP network. Next, the method can include the step of decapsulating the encapsulated TCAP message received at the second network node in the IP network. Thereafter, the method comprises the step of extracting the TCAP message from the decapsulated TCAP message in the IP protocol format, without altering the TCAP characteristics of the TCAP message. Further, the method can include the steps of formatting the extracted TCAP message into the SS7 protocol format, and thereafter transmitting the TCAP message in the SS7 protocol format to the public telephone network. In addition, the method can further comprise the steps of receiving the TCAP message at the second network node in the public telephone network, and thereafter extracting the TCAP message from the TCAP message in the SS7 protocol format received at the second network node in the public telephone network. As such, the TCAP message originating in the network node in the IP network can be recovered.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed herein and that modifications and other embodiments are intended to be included within the scope of the appended claims which define the present invention.

What is claimed is:

1. An apparatus for providing signaling and service interworking between a public telephone network and an internet protocol network, wherein the public telephone network transmits and receives a:message in a first format of a first type and the internet protocol network transmits and receives a message in a second format of a second type, and wherein the apparatus comprises:

a first interface for communicating with the public telephone network, said first interface adapted to exchange messages in the first format of the first type with the public telephone network;

a second interface for communicating with the internet protocol network, said second interface adapted to exchange messages in the second format of the second type with the internet protocol network; and a processor, operably connected to at least one of said first interface and said second interface, wherein said processor is adapted for translating the message received in the first format from the public telephone network into the second format, such that public telephone network addressing and routing information in the message received is converted for the internet protocol network, and wherein said processor is adapted for forwarding the message encapsulated in the second format to the internet protocol network, such that signaling and service interworking can thereby be provided by exchanging messages between the public telephone network and the internet protocol network.

2. The apparatus according to claim 1, wherein said processor is further adapted for translating the message received from the internet protocol network in the second format, such that the internet protocol network addressing and routing information in the message received is converted for the public telephone network, and wherein said processor is adapted for forwarding the message in the first format to the public telephone network.

3. The apparatus according to claim 1, wherein the first format translated by said processor is an SS7 protocol format, and wherein the second format translated by said processor is an IP protocol format.

4. The apparatus according to claim 1, wherein the first said interface is adapted to exchange TCAP messages with the public telephone network, wherein said second interface is adapted to exchange TCAP messages with the internet protocol network, wherein the first type of message is an SS7 TCAP message, and wherein the second type of message is an encapsulated TCAP message.

5. The apparatus according to claim 1, wherein the first said interface is adapted to exchange ISUP messages with the public telephone network, wherein said second interface is adapted to exchange ISUP messages with the internet protocol network, wherein the first type of message is an SS7 ISUP message, and wherein the second type of message is an encapsulated ISUP message.

6. The apparatus according to claim 1, further comprising a storage memory operably connected to said processor for maintaining addressing and routing information relating to the public telephone network and the internet protocol network.

7. The apparatus according to claim 6, wherein the storage memory contains a table correlating a plurality of internet protocol network node addresses and a plurality of public telephone network signaling node addresses, and wherein said processor is responsive to said storage memory for remapping an address of an incoming signaling message received into one of said first interface and said second interface, prior to forwarding an outgoing signaling message representative of the incoming message with a remapped address through the other of said first interface and said second interface.

8. The apparatus according to claim 7, wherein each internet protocol network node address stored in said storage memory comprises an IP address and a port number, and wherein each public telephone network node address stored in said storage memory comprises a point code and a circuit identification code, for permitting said processor to convert ISUP messages received from at least one of the public telephone network and the internet protocol network into a format compatible with the other of the public telephone network and the internet protocol network.

9. The apparatus according to claim 7, wherein each internet network node address stored in said storage memory comprises an IP address and a port number, and wherein each public telephone network node address stored in said storage memory comprises a destination point code and a subsystem number, for permitting said processor to convert TCAP messages received from at least one of the public telephone network and the internet protocol network into a format compatible with the other of the public telephone network and the internet protocol network.

10. The apparatus according to claim 6, wherein said processor is adapted to serve as a signaling end point for the public telephone network.

11. The apparatus according to claim 6, wherein said processor is further adapted to serve as a signaling transfer point to the public telephone network.

12. The apparatus according to claim 7, wherein said processor and said first interface are adapted to operate as one or more SS7 signaling links selected from the group consisting of an A link, a B link, a D link, and an E link for interfacing with the public telephone network.

13. The apparatus according to claim 12, wherein said processor and said second interface are adapted to operate as one or more pseudo SS7 signaling links selected from the group consisting of an A link ad an E link, so as to emulate the respective SS7 signaling for interfacing with the internet protocol network.

14. The apparatus according to claim 13, wherein said processor is further adapted to exchange signaling messages with the public telephone network and the internet protocol network such that load sharing of signaling messaging traffic can be provided by said processor between network entities in at least one of the public telephone network and the internet protocol network.

15. The apparatus according to claim 13, wherein said processor is further adapted to exchange signaling messages with the public telephone network and the internet protocol network such that hot standby processing of signaling messaging traffic can be provided by said processor between network entities in at least one of the public telephone network and the internet protocol network.

16. The apparatus according to claim 13, wherein said processor is further adapted to reroute a signaling message received from one of the public telephone network and the internet protocol network to a backup network destination entity in the other of the public telephone network and the internet protocol network when the signaling message cannot be delivered to a primary network destination entity.

17. A method for providing signaling interworking between a public telephone network and an internet protocol network, comprising the steps of:
receiving at least one of an ISUP message and a TCAP message from the public telephone network in an SS7 protocol format;
extracting at least one of the ISUP message and the TCAP message from the SS7 protocol format; and
encapsulating at least one of the ISUP message and the TCAP message in an IP protocol format, such that at least one of the ISUP message and the TCAP message can respectively be forwarded to the internet protocol network to permit signaling interworking therethrough.

18. The method according to claim 17, further comprising the step of transmitting at least one of the encapsulated ISUP message and the encapsulated TCAP message in the IP protocol format to a network node in the internet protocol network, after said encapsulating step.

19. The method according to claim 18, further comprising the step of decapsulating at least one of the encapsulated ISUP message and the encapsulated TCAP message in the IP protocol format received by the network node in the internet protocol network, to respectively permit recovery of at least one of the original ISUP message and the original TCAP message.

20. The method according to claim 19, further comprising the step of forwarding at least one of the received ISUP message and the received TCAP message in the SS7 protocol format to the public telephone network, after said decapsulating step.

21. A method for selectively interworking the public telephone network and the IP network, comprising the steps of:
receiving a TCAP message from the public telephone network in a first format;
extracting the TCAP message from the first format; and
encapsulating the TCAP message in a second format, such that the TCAP message can be forwarded to the IP network to permit interworking therethrough.

22. The method according to claim 21, wherein the first format is an SS7 protocol format, and wherein the second format is an IP protocol format.

23. The method according to claim 21, further comprising the step of transmitting the encapsulated TCAP message to a network node in the IP network, after said encapsulating step.

24. The method according to claim 21, further comprising the step of decapsulating the encapsulated TCAP message received by the network node in the IP network, to permit recovery of the original TCAP message.

25. The method according to claim 21, wherein the second format is an IP protocol format, further comprising the steps of:
encapsulating a TCAP message originating in the network node in the IP network in the IP protocol format, such that the TCAP message can be forwarded through the IP network; and
transmitting the encapsulated TCAP message to the IP network.

26. The method according to claim 25, further comprising the steps of:
receiving an encapsulated TCAP message at a second network node in the IP network;
decapsulating the encapsulated TCAP message received at the second network node in the IP network; and
extracting the TCAP message from the decapsulated TCAP message in the IP protocol format, without altering the TCAP characteristics thereof.

27. The method according to claim 26, wherein the first format is an SS7 protocol format, the method further comprising the steps of:
formatting the extracted TCAP message into the SS7 protocol format; and
transmitting the TCAP message in the SS7 protocol format to the public telephone network.

28. The method according to claim 27, further comprising the steps of:
receiving the TCAP message at the second network node in the public telephone network; and
extracting the TCAP message from the TCAP message in the SS7 protocol format received at the second network node in the public telephone network, such that the TCAP message originating in the network node in the IP network can be recovered.

29. An apparatus for exchanging encapsulated TCAP messages with an IP network and a PTN, wherein the IP network is adapted to transmit and receive a second type of message in a second format, and wherein the apparatus comprises:
a first interface for communicating with the IP network said first interface adapted to exchange encapsulated TCAP message in the second format with the IP network; and
a processor operably connected to said first interface, wherein said processor is adapted for extracting a TCAP message from an encapsulated TCAP message in the second format received from the IP network through said first interface, and wherein said processor is adapted to encapsulate a TCAP message and forward the encapsulated TCAP message in the second format to the IP network through said first interface, such that encapsulated TCAP messages in the second format can be exchanged from the PTN to the IP network.

30. The apparatus according to claim 29, wherein the second format is an IP protocol format, and wherein the second type of message is an encapsulated TCAP message in the IP protocol format.

31. The apparatus according to claim 29, wherein said processor is further adapted to execute TCAP software applications.

32. The apparatus according to claim 31, wherein said processor is further adapted to provide telephony services to the IP network and PTN.

33. The apparatus according to claim 32, wherein said processor is further adapted to execute STIP software applications such that SCCP primitives can be provided to TCAP software applications for exchanging TCAP messages therewith.

34. The apparatus according to claim 29, further comprising a translation device having an IP network interface for communicating therewith and having a public telephone network interface for communicating therewith, said translation device operably connected to the apparatus through the IP network interface and to the public telephone network, said translation device adapted for receiving an encapsulated TCAP message from the apparatus through the IP network and forwarding a representative TCAP message to the public telephone network, said translation device further adapted for receiving a TCAP message from the public telephone network and forwarding a representative encapsulated TCAP message to the apparatus through the IP network, such that TCAP messages can be exchanged between the apparatus and the public telephone network through the IP network.

35. An apparatus for selectively interworking a public telephone network and an IP network, wherein the public telephone network transmits and receives a TCAP message in a first format and the IP network transmits and receives a second type of message in a second format, wherein the apparatus comprises:
a first interface for communicating with the public telephone network, said first interface adapted to exchange TCAP messages in the first format with the public telephone network;
a second interface for communicating with the IP network, said second interface adapted to exchange the second type of messages in the second format with the IP network; and
a processor, operably connected to at least one of said first interface and said second interface, wherein said processor is adapted for translating the TCAP message received in the first format from the public telephone network, encapsulating the TCAP message in the second format, and forwarding the encapsulated TCAP message to the IP network.

36. The apparatus according to claim 35, wherein the first format is an SS7 protocol format, and wherein the second format is an IP protocol format.

37. The apparatus according to claim 35, wherein said processor is further adapted for translating an encapsulated TCAP message received from the IP network and forwarding a TCAP message in the first format to the public telephone network.

38. The apparatus according to claim 37, wherein the second type of message is an encapsulated TCAP message, wherein the first format is an SS7 protocol format, and wherein the second format is an IP protocol format.

39. The apparatus according to claim 37, further comprising a storage memory operably connected to said processor for maintaining addressing and routing information relating to the public telephone network and the IP network.

40. The apparatus according to claim 39, wherein the storage memory contains a table correlating a plurality of IP network node addresses and a plurality of public telephone network node addresses, and wherein said processor is responsive to said storage memory for remapping an address of an incoming message received into one of said first interface and said second interface, prior to forwarding an outgoing message representative of the incoming message with a remapped address through the other of said first interface and said second interface.

41. The apparatus according to claim 40, wherein each IP network node address comprises an IP address and a port number, and wherein each public telephone network node address comprises a destination point code and a public telephone addressing parameter selected from the group consisting of a global title and a subsystem number.

42. The apparatus according to claim 40, wherein said processor is adapted to serve as a signaling end point for the public telephone network, and wherein said processor is adapted to serve as a transit signaling point for the IP network.

43. The apparatus according to claim 40, wherein said processor is adapted to provide addressing and routing approximate to SCCP addressing and routing to the IP network and SCCP addressing and routing to the public telephone network.

44. The apparatus according to claim 35, wherein said processor is further adapted to provide signaling transfer point functions and represent a network node in the public telephone network.

45. The apparatus according to claim 35, wherein said processor is further adapted to execute a STIP software application program, forward the encapsulated TCAP message to the IP network, and represent a network node in the IP network.

46. The apparatus according to claim 35, wherein said processor translates the TCAP message received from the public telephone network without altering the TCAP characteristics thereof.

47. The apparatus according to claim 35, wherein the TCAP message in the first format received by the public telephone network has a TCAP portion, an SCCP portion, and an MTP portion, and wherein the second format forwarded to the IP network comprises an encapsulated TCAP message having at least a TCAP portion, a STIP portion, and an IP protocol portion, after translation by said processor.

48. The apparatus according to claim 45, wherein the encapsulated TCAP message further comprises a transport portion selected from the group consisting of TCP, UDP, and another Internet transport portion disposed between the STIP portion and the IP protocol portion in the second message format.

49. The apparatus according to claim 37, wherein said processor translates the encapsulated TCAP message received from the IP network without altering the TCAP characteristics thereof.

50. The apparatus according to claim 37, wherein the second message format comprises an encapsulated TCAP message received from the IP network having at least a TCAP portion, a STIP portion, and an IP protocol portion, and wherein the second message format comprises a TCAP message forwarded to the public telephone network having at least a TCAP portion, an SCCP portion, and an MTP portion, after translation by said processor.

51. The apparatus according to claim 50, wherein the encapsulated TCAP message further comprises a transport portion disposed between the STIP portion and the IP protocol portion.

52. A system for selectively interworking a public telephone network and an IP network, comprising:
 a first network node;
 a second network node; and
 at least one interworking apparatus, operably connected to at least one of said first network node and said second network node, wherein each interworking apparatus further comprises:
  a first interface for communicating with the public telephone network, said first interface adapted to exchange TCAP messages in a first format with the public telephone network;
  a second interface for communicating with the IP network, said second interface adapted to exchange Internet messages in a second format with the IP network; and
  a processor, operably connected to said first interface and said second interface, wherein said processor is adapted for extracting a TCAP message received in the first format from the public telephone network and forwarding an encapsulated TCAP message in the second format to the IP network, and wherein said processor is adapted for translating an encapsulated TCAP message received in the second format from the IP network and forwarding a TCAP message in the first format to the public telephone network.

53. The system according to claim 52, wherein the first format is an SS7 protocol format, and wherein the second format is an IP protocol format.

54. The system according to claim 52, wherein said first network node comprises part of the public telephone network and is operably connected to said first interface, and wherein said second network node comprises part of the IP network and is operably connected to said second interface, such that said first network node and said second network node are each connected to said at least one interworking apparatus.

55. The system according to claim 52, wherein said first network node and said second network node each comprise a processor, wherein the first format is an SS7 protocol format, wherein the processor in said first network node is adapted to exchange TCAP messages in the SS7 protocol with said at least one interworking apparatus, and wherein the processor in said second network node is adapted to exchange encapsulated TCAP messages with said at least one interworking apparatus, such that said first network node and said second network node can exchange TCAP messages through said at least one interworking apparatus.

56. The system according to claim 55, wherein each processor is adapted to execute a TCAP application software program, such that the TCAP application software programs in said first network node and said second network node can communicate through said at least one interworking apparatus.

57. The system according to claim 52, comprising a first interworking apparatus and a second interworking apparatus, wherein said first interworking apparatus is operably connected to said first network node, wherein said second interworking apparatus is operably connected to said second network node, and wherein said first interworking apparatus and said second interworking apparatus are operably connected.

58. The system according to claim 57, wherein said first network node comprises part of a first public telephone network, wherein said second network node comprises part of a second public telephone network, and wherein said first interworking apparatus and said second interworking apparatus are operably connected through the IP network, such that said first network node and said second network node are operably connected through said first interworking apparatus and said second interworking apparatus.

59. The system according to claim 57, wherein said first interworking apparatus and said second interworking apparatus provide signaling transport functions between said first public telephone network and said second public telephone network.

60. The system according to claim 57, wherein said first interworking apparatus and said second interworking apparatus provide at least one function selected from the group consisting of calling name delivery, local number portability, automatic recall, and automatic callback, between said first public telephone network and said second public telephone network.

61. The system according to claim 57, wherein said first public telephone network and said second public telephone network are the same public telephone network.

62. The system according to claim 57, wherein said first network node comprises part of a first IP network, wherein said second network node comprises part of a second IP network, and wherein said first interworking apparatus and said second interworking apparatus are operably connected through a public telephone network, such that said first network node and said second network node are operably connected through said first interworking apparatus and said second interworking apparatus.

63. The system according to claim 62, wherein said first IP network and said second IP network are the same IP network.

64. The system according to claim 52, wherein said first network node comprises a public telephone terminal operably connected to the public telephone network, wherein said second network node comprises an IP telephone terminal operably connected to the IP network, and wherein said at least one interworking apparatus serves to interconnect the IP telephone terminal and the public telephone terminal, so as to permit the IP telephone terminal to place a telephone call through the IP network and the public telephone network to the public telephone terminal.

65. The system according to claim 52, wherein said first network node comprises a public telephone network node operably connected to the public telephone network requesting short message services, wherein said second network node comprises a short message services server operably connected to the IP network, and wherein said at least one interworking apparatus serves to interconnect the first and second network nodes, so as to permit the IP network based short message services server to provide short message services to the public telephone network subscribers.

66. The system according to claim 52, wherein said first network node comprises a public telephone network node operably connected to the public telephone network requesting a telephony based service through TCAP messaging, wherein said second network node comprises a telephony based service server operably connected to the IP network, and wherein said at least one interworking apparatus serves to interconnect said first and second network nodes, so as to permit the services server on the IP network to provide the telephony based service to the public telephone network.

67. An apparatus for selectively interworking the public telephone network and the IP network, comprising:
  means for communicating with the public telephone network, wherein said means for communicating with the public telephone network is adapted to exchange TCAP messages over the SS7 protocol format with the public telephone network;
  means for communicating with the IP network, wherein said means for communicating with the IP network is adapted to exchange TCAP messages over the IP protocol format with the IP network; and
  means for translating a TCAP message received in the SS7 protocol format from the public telephone network and forwarding an encapsulated TCAP message in the IP protocol format to the IP network.

68. The apparatus according to claim 67, further comprising means for translating an encapsulated TCAP message received from the IP network and forwarding a TCAP message in the SS7 protocol to the public telephone network.

69. A system for selectively interworking the public telephone network and the IP network, comprising:
  a first network node;
  a second network node; and
  at least one interworking apparatus, operably connected to at least one of said first network node and said second network node, wherein each interworking apparatus further comprises:
    means for communicating with the public telephone network adapted to exchange TCAP messages over the SS7 protocol format with the public telephone network;
    means for communicating with the IP network adapted to exchange TCAP messages over the IP protocol format with the IP network; and
    means for translating, operably connected to at least one of said means for communicating with the public telephone network and said means for communicating with the IP network, wherein said means for translating is adapted to translate a TCAP message received in the SS7 protocol format from the public telephone network and forward an encapsulated TCAP message in the IP protocol format to the IP network, and wherein said means for translating is adapted to translate an encapsulated TCAP message received in the IP protocol format from the IP network and forward a TCAP message in the SS7 protocol format to the public telephone network.

70. An apparatus for exchanging signaling messages with an internet protocol network, wherein the internet protocol network is adapted to transmit and receive messages in a second format of a second type, and wherein the apparatus comprises:
  a first interface for communicating with the internet protocol network, said first interface adapted to exchange messages in the second format of the second type with the internet protocol network;
  a processor operably connected to said first interface, wherein said processor is adapted for processing a message of the second type encapsulated in the second format received from the internet protocol network through said first interface, and wherein said processor is further adapted to forward a message of the second type in the second format to the internet protocol network, such that signaling and service interworking can thereby be provided by exchanging encapsulated messages with the internet protocol network; and
  wherein said processor and said first interface are adapted to operate as one or more pseudo SS7 signaling link selected from the group consisting of an A link and an E link, so as to emulate the respective SS7 signaling link for interfacing with the internet protocol network.

71. The apparatus according to claim 70, wherein the second format translated by said processor is an IP protocol format for encapsulating the message of the second type therein.

72. The apparatus according to claim 71, wherein the message of the second type translated by said processor comprises at least one of an encapsulated TCAP message and an encapsulated ISUP message.

73. The apparatus according to claim 70, wherein said processor is adapted to execute a software application program to operate as at least one of a signaling end point, a service switching point, a service control point, and a call server/ca controller.

74. A system for providing signaling and service interworking between a public telephone network and an internet protocol network, comprising:
  a first network node, operably connected to the public telephone network;
  a second network node, operably connected to the internet protocol network; and
  at least one interworking apparatus, operably connected to at least one of said first network node and said second network node, wherein each interworking apparatus further comprises:
    a first interface for communicating with the public telephone network, said first interface adapted to exchange ISUP messages and TCAP messages in a first format with the public telephone networks;
    a second interface for communicating with the internet protocol network, said second interface adapted to exchange ISUP messages and TCAP messages in a second format with the internet protocol network; and
    a processor, operably connected to said first interface and said second interface, wherein said processor is adapted for extracting at least one of an ISUP message and a TCAP message received in the first format from the public telephone network and forwarding an encapsulated message containing at least one of an ISUP message and a TCAP message in the second format to the internet protocol network, and wherein said processor is adapted for translating an encapsulated message containing at least one of an ISUP message and a TCAP message in the second format received from the internet protocol network and forwarding at least one of an ISUP message and a TCAP message in the first format to the public telephone network.

75. The system according to claim 74, wherein the first format translated by said processor is an SS7 protocol format, and wherein the second format translated by said processor is an IP protocol format.

76. The system according to claim 74, wherein said first network node comprises part of the public telephone network and is operably connected to said first interface, and wherein said second network node comprises part of the internet protocol network and is operably connected to said second interface, such that said first network node and said second network node are each connected to said at least one interworking apparatus and can communicate therethrough.

77. The system according to claim 76, wherein said first network node and said second network node each comprise a processor, wherein the first format is an SS7 protocol format, wherein the processor of said first network node is adapted to exchange at least one of an ISUP message and a TCAP message in the SS7 protocol with said at least one interworking apparatus, and wherein the process of said second network node is adapted to exchange encapsulated messages containing at least one of an ISUP message and a TCAP message with said at least one interworking apparatus, such that said first network node and said second network node can exchange at least one of an ISUP message and a TCAP message through said at least one interworking apparatus.

78. The system according to claim 77, wherein each processor is adapted to execute a TCAP application software program, such that the TCAP application software programs in said first network node and said second network node can communicate through said at least one interworking apparatus and exchange telephony services.

79. The system according to claim 74, wherein each processor is adapted to execute an ISUP application software program, such that the ISUP application software programs in said first network node and said second network node can communicate through said at least one interworking apparatus and exchange telephony signaling.

80. The system according to claim 74, comprising a first interworking apparatus and a second interworking apparatus, wherein said first interworking apparatus and said second interworking apparatus are operably connected to each other such that messages are exchanged therebetween, wherein are least one of said first interworking apparatus and said second interworking apparatus it further operably connected to said first network node, wherein at least one of said first interworking apparatus and said second interworking apparatus is further operably connected to said second network node, such that messages can be exchanged between said first network node and said second network node through the operably connected interworking apparatuses.

81. The system according to claim 80, wherein said first interworking apparatus and said second interworking apparatus are adapted to emulate at least one pseudo SS7 signaling link selected from the group consisting of an A link and an E link, so as to emulate the respective SS7 signaling link for interfacing with said second network node through the internet protocol network.

82. The system according to claim 80, wherein said first interworking apparatus and said second interworking apparatus are adapted to emulate at least one SS7 network reliability function selected from the group consisting of load sharing, active standby operation, primary/backup operation, network node bypass, and failover operations between said second network node and said first and second interworking apparatuses.

83. The system according to claim 82, wherein said second network node further comprises a processor executing a software application program, such that said second network node is adapted to operate as at least one of a signaling end point, a service switching point, a service control point, and a call server/call controller.

84. An apparatus for providing signaling and service interworking between a public telephone network and all internet protocol network, comprising:
   means for communicating with the public telephone network, wherein said means for communicating with the public telephone network is adapted to exchange at least one of an ISUP message and a TCAP message over the SS7 protocol format with the public telephone network;
   means for communicating with the internet protocol network, wherein said means for communicating with the internet protocol network is adapted to exchange at least one of an encapsulated ISUP message and an encapsulated TCAP message over the IP protocol format with the internet protocol network; and
   means for translating at least one of the ISUP message and the TCAP message in the SS7 protocol format received from the public telephone network and respectively forwarding at least one of the encapsulated ISUP message and the encapsulated TCAP message in the IP protocol format to the internet protocol network.

85. The apparatus according to claim 84, further comprising means for translating at least one of an encapsulated ISUP message and an encapsulated TCAP message received from the internet protocol network and respectively forwarding at least one of an ISUP message and a TCAP message in the SS7 protocol to the public telephone network.

86. A system for providing signaling and service interworking between a public telephone network and an internet protocol network, comprising:
   a first network node, operably connected to the public telephone network;
   a second network node, operably connected to the internet protocol network; and
   at least one interworking apparatus, operably connected to at least one of the said first network node and said second network node, wherein each interworking apparatus further comprises:
   means for communicating with the public telephone network adapted to exchange ISUP messages and TCAP messages over the SS7 protocol format with the public telephone network;
   means for communicating with the internet protocol network adapted to exchange encapsulated ISUP messages and encapsulated TCAP messages over the IP protocol format with the internet protocol network; and
   means for translating, operably connected to at least one of said means for communicating with the public telephone network and said means for communicating with the internet protocol network wherein said means for translating is adapted to translate at least one of an ISUP message and a TCAP message received in the SS7 protocol format from the public telephone network, and adapted to respectively forward at least one of an encapsulated ISUP message and an encapsulated TCAP message in the IP protocol format to the internet protocol network.

87. The system according to claim 86, wherein said means for translating is adapted to translate at least one of an encapsulated ISUP message and an encapsulated TCAP message in the IP protocol format received from the internet protocol network and respectively forward at least one of an ISUP message and a TCAP message in the SS7 protocol format to the public telephone network.

* * * * *